US012801718B2

(12) United States Patent
Meier

(10) Patent No.: US 12,801,718 B2
(45) **Date of Patent: *Nov. 17, 2026**

(54) SECURE ASSOCIATION OF AN INSTALLED APPLICATION INSTANCE WITH A SERVICE

(71) Applicant: Bitstrata Systems Inc., Saskatoon (CA)

(72) Inventor: Ian Robert Meier, Saskatoon (CA)

(73) Assignee: Bitstrata Systems Inc., Saskatoon (CA)

( * ) Notice: Subject to any disclaimer, the term of this patent is extended or adjusted under 35 U.S.C. 154(b) by 578 days.

This patent is subject to a terminal disclaimer.

(21) Appl. No.: 18/133,308

(22) Filed: Apr. 11, 2023

(65) Prior Publication Data

US 2023/0244776 A1 Aug. 3, 2023

Related U.S. Application Data

(63) Continuation of application No. 15/850,794, filed on Dec. 21, 2017, now Pat. No. 11,657,136.

(51) Int. Cl.

| | |
|---|---|
| ***G06F 21/41*** | (2013.01) |
| ***H04L 9/40*** | (2022.01) |
| *H04W 88/04* | (2009.01) |

(52) U.S. Cl.

CPC .......... *G06F 21/41* (2013.01); *H04L 63/0407* (2013.01); *H04L 63/0884* (2013.01);

(Continued)

(58) Field of Classification Search

CPC . G06F 21/41; H04L 63/0407; H04L 63/0884; H04L 63/0807; H04L 63/0815;

(Continued)

(56) References Cited

U.S. PATENT DOCUMENTS

| | | | |
|---|---|---|---|
| 8,938,810 | B2 | 1/2015 | Richardson et al. |
| 9,244,668 | B1 | 1/2016 | Opos et al. |

(Continued)

FOREIGN PATENT DOCUMENTS

| | | | |
|---|---|---|---|
| CA | 2423636 | A1 | 10/2003 |
| CA | 2936810 | A1 | 7/2015 |

(Continued)

OTHER PUBLICATIONS

"Find and Add Friends", Snapchat, Retrieved Oct. 19, 2017, 2 pages, https://support.snapchat.com/en-US/a/about-friends-screen.

(Continued)

*Primary Examiner* — Sheway e Gelagay
*Assistant Examiner* — Carlton Johnson
(74) *Attorney, Agent, or Firm* — Lempia Summerfield Katz LLC

(57) ABSTRACT

The disclosed embodiments relate to systems and methods for securely associating an application installation with an account of a service. The computer implemented method may include an inviting device with authenticated access to an account provided by a service having data stored therein. An invite code may be generated in response to a request to enable another device to have access to the service account without identifying the other device. The inviting device may provide the invite code to an invited device. The disclosed embodiments enable an inviting device to provide secure and convenient authenticated account access to multiple devices.

44 Claims, 20 Drawing Sheets

(52) U.S. Cl.
CPC ...... *H04L 63/0807* (2013.01); *H04L 63/0815* (2013.01); *H04L 63/083* (2013.01); *H04W 88/04* (2013.01)

(58) Field of Classification Search
CPC ... H04L 63/083; H04L 63/0853; H04W 88/04
See application file for complete search history.

(56) References Cited

U.S. PATENT DOCUMENTS

| | | | | |
|---|---|---|---|---|
| 2009/0187484 | A1* | 7/2009 | Arbogast | A01N 59/04 504/116.1 |
| 2009/0215476 | A1 | 8/2009 | Tysowski | |
| 2012/0203594 | A1 | 8/2012 | Groer et al. | |
| 2013/0019237 | A1 | 1/2013 | Pardehpoosh et al. | |
| 2014/0040628 | A1* | 2/2014 | Fort | H04L 63/18 713/182 |
| 2014/0222675 | A1 | 8/2014 | Mao et al. | |
| 2015/0220888 | A1 | 8/2015 | Iyer | |
| 2015/0288701 | A1 | 10/2015 | Brand | |
| 2015/0358478 | A1 | 12/2015 | Arazi et al. | |
| 2015/0381605 | A1 | 12/2015 | Ko et al. | |
| 2016/0072785 | A1 | 3/2016 | Statica et al. | |
| 2016/0182658 | A1 | 6/2016 | Allinson et al. | |
| 2016/0219027 | A1 | 7/2016 | Kaplan et al. | |
| 2016/0255092 | A1 | 9/2016 | Adams et al. | |
| 2016/0261647 | A1 | 9/2016 | Yerli | |
| 2017/0041296 | A1* | 2/2017 | Ford | G06F 21/64 |
| 2017/0324751 | A1 | 11/2017 | Prabhu | |
| 2019/0164161 | A1* | 5/2019 | Sultan | G06Q 20/042 |

FOREIGN PATENT DOCUMENTS

| | | | |
|---|---|---|---|
| CN | 105847880 | A | 8/2016 |
| KR | 20160145450 | A | 12/2016 |
| KR | 101754486 | B1 | 7/2017 |
| WO | 2014/119950 | A1 | 8/2014 |
| WO | 2015/008075 | A1 | 1/2015 |
| WO | 2017/100301 | A1 | 6/2017 |
| WO | 2017196774 | A1 | 11/2017 |

OTHER PUBLICATIONS

"Fusion Middleware Administrators's Guide for Oracle Access Management", Oracle, 2017, 47 pages, https://docs.oracle.com/cd/E40329_01/admin.1112/e27239/toc.htm.

International Search Report and Written Opinion, from PCT/CA2018/051488, Feb. 20, 2019, WO.

Supplementary European Search Report, from EP Application No. 18893092, Jul. 2, 2021.

* cited by examiner

SECURE ASSOCIATION OF AN INSTALLED APPLICATION INSTANCE WITH A SERVICE

CROSS REFERENCE TO RELATED APPLICATIONS

The present application is a continuation under 37 C.F.R. § 1.53(b) of U.S. patent application Ser. No. 15/850,794 filed Dec. 21, 2017, now U.S. Pat. No. 11,657,136, the entire disclosure of which is incorporated by reference herein.

BACKGROUND

Many multi-user software systems/services compartmentalize their operations with respect to different users by using "accounts," which are created and associated with each user and used to segregate the operations of the system, data, etc. with respect to one user from another. An example of such a system may be an electronic mail system where users sign up for electronic mail accounts, or cloud data storage service where users may create accounts in which to remotely store data, such as electronic documents or images.

Such systems may further support the participation of two or more users in a given account or otherwise allow users to link their accounts, such as to share data, e.g. content and/or services. The joint or linked account, referred to as a "shared account," provides for the association, communication, contribution, and/or collaboration between the respective users. Some examples of such a system may be a file sharing service that allows users to upload electronic data files such as documents, pictures, etc. to share with other users, e.g. for viewing or editing thereby, and view/edit electronic data files uploaded by other users, a joint banking account that may allow users to view account information and/or send and receive money, or an agricultural data management system that may allow users, e.g. farm workers, to collaborate in the collection and/or management of agricultural data such as via mobile devices. For the purposes of this disclosure, a shared account may refer to an account/system/service where the account/service provider may at least distinguish the particular users thereof or devices used thereby, and therefore the term shared account, as used herein, does not refer to an account intended for use by a single user but where multiple users, for example, merely share the same credentials or device for using the account such that their individual usage cannot be distinguished.

These multi-user systems generally support an initial account creation process, whereby a user can create a new account, and a subsequent or contemporaneous invitation process, whereby that initial user can then invite other users/accounts to participate in the shared account. The invitation process generally incorporates security measures to ensure that only the invited users or accounts are associated with the initial account in order to prevent unauthorized access to the shared account.

One known method for supporting this security includes the use of a specific/unique username and password for each user and/or for the shared account. However, the process of creating a secure username and password may be considered cumbersome and secure usernames and passwords may be inconvenient to remember, as it is difficult to create passwords that are both secure and easy to remember. Furthermore, users often are members of many accounts, exacerbating the difficulty of remembering their specific credentials and using the same usernames and passwords for different accounts is considered to be insecure.

One solution to the problem of having to remember multiple usernames and passwords is to use password-management tools, such as 1Password or LastPass, which function as repositories for usernames and passwords for the accounts in which the user is registered. However, these solutions still require the initial creation of a secure username and password for each account. Furthermore, if access to the passwords management tool is lost, the user must again remember their individual usernames and passwords or otherwise be unable to access their accounts.

Cookies are another way to remember previously entered usernames and passwords. However, cookies are vulnerable to hacker attacks. Cookies only remember previously entered information and the user still needs to enter a username and password to gain initial admission to the system such that a cookie can be created for later access.

Other solutions include permitting a user to use one set of login credentials (e.g., name and password) to access multiple accounts. For example, software services have begun to support single sign-on to allow users to use authentication from other services such as Google or Facebook instead of creating a new set of credentials. The following describes an example of the account creation and user invitation process using a single sign-on service which may be initiated via website/web application or via a specific application, such as an app executing on a mobile device. This example could be easily adapted to other types of systems such as instant messaging, social networking, project management, document collaboration, and workflow management.

a. Account Creation: An administrative user visits a website or initiates a feature of a mobile application to create an account. The account requires creation of a username and password or providing a username from third-party single sign-on (SSO) service, such as Google or Facebook. The account creation process may involve entering identifying information such as a name, address, email address, phone number, etc.

b. Initial Device Sign-in: The credentials from the account creation step are then entered on the website or via the mobile device app. Alternatively, the credentials may be entered automatically.

c. User Invitation: If an administrative user wishes to invite another user to participate in the account, they create another user through the mobile application or a web application. The creation of a new user involves entering identifying information, such as a name and email, and creation of a username and a temporary password or adding a username name from a third-party SSO service. An automatically generated email may be sent to the invited user.

d. Invited User Device Sign-in: The invited user may receive an email or may be contacted in some other way. The invited user will then proceed to sign into the account using the created username and password or the SSO credentials. In the case of a username and password, the invited user would normally be instructed to change their password from the temporary one to a personal one. The username and changed password then need to be remembered or otherwise retained by the user.

As can be seen, accounts using the SSO services still require each user to provide a secure username and password to gain admission to the system.

It will be appreciated that when attempting to entice users to use a new software service, the process of creating accounts and associated usernames, along with appropriate passwords, may present an impediment to successfully add new users and may cause the existing users to abandon the service.

Accordingly, some services have attempted to eliminate the use of a username and password, at least with respect to users being able to enable additional devices, e.g. additional mobile devices, to have access to an account or service already associated with the user. For example, a method known in the art for authenticating a user account on a second access platform, such as a mobile device, includes sending a link to the second access platform from a first access platform, e.g. a desktop computer, which already has access to the user account. In particular, a user can connect to a service, such as a content management system's website, at a first access platform such as on their desktop computer. At the first access platform, the user provides a unique identifier for a second access platform, e.g. the phone number associated with the mobile device. Once the service receives the identifier through the first access platform, the system generates a link which includes a special security code that is tied to the user account and the second access platform. The content management system sends the link to the second access platform by using the identifier that has been provided through the first access platform, such as via SMS. When the link is accessed by the user at the second access platform, the user account is authenticated at the second access platform without requiring the user to provide a username or password. While this method may make it easier for a user to enable additional devices to access a service, this method requires that the user knows an identifier associated with the second access platform before generating and sending the link, which is cumbersome when trying to authenticate multiple devices or when the user wishes to authenticate a device for which the identifier is unknown.

Another solution to eliminate the use of credentials includes a method for authenticating a new user for access to a shared account by providing an initiation code to an administrator of the account. For example, the new user initiates access to the account via their mobile device and, in response, the system generates an initiation code which is displayed on the new user's mobile device. The new user then passes the initiation code to an account administrator (for example, orally) along with a request for access to the account for which the account administrator is responsible. The account administrator may be an individual, for example a Chief Financial Officer of a business, with administration privileges, such as the rights to add new users for a particular account. The administrator of the account then verifies that the new user should have access to the account, thereby enabling access. While this method simplifies access to an account for a new user, it requires the new user to initiate the process and also places a significant burden on the account administrator when verifying multiple devices since the account administrator must verify that every new user should have access to the account. Furthermore, it requires the new user to wait for the account administrator to validate their access.

As can be seen, the methods described above may be inconvenient and complicated, which may cause user frustration and increased customer support costs for the businesses operating the software system. Accordingly, such systems need to provide a secure and convenient way to provide authenticated account access to multiple devices.

DETAILED DESCRIPTION

Figure 1A:
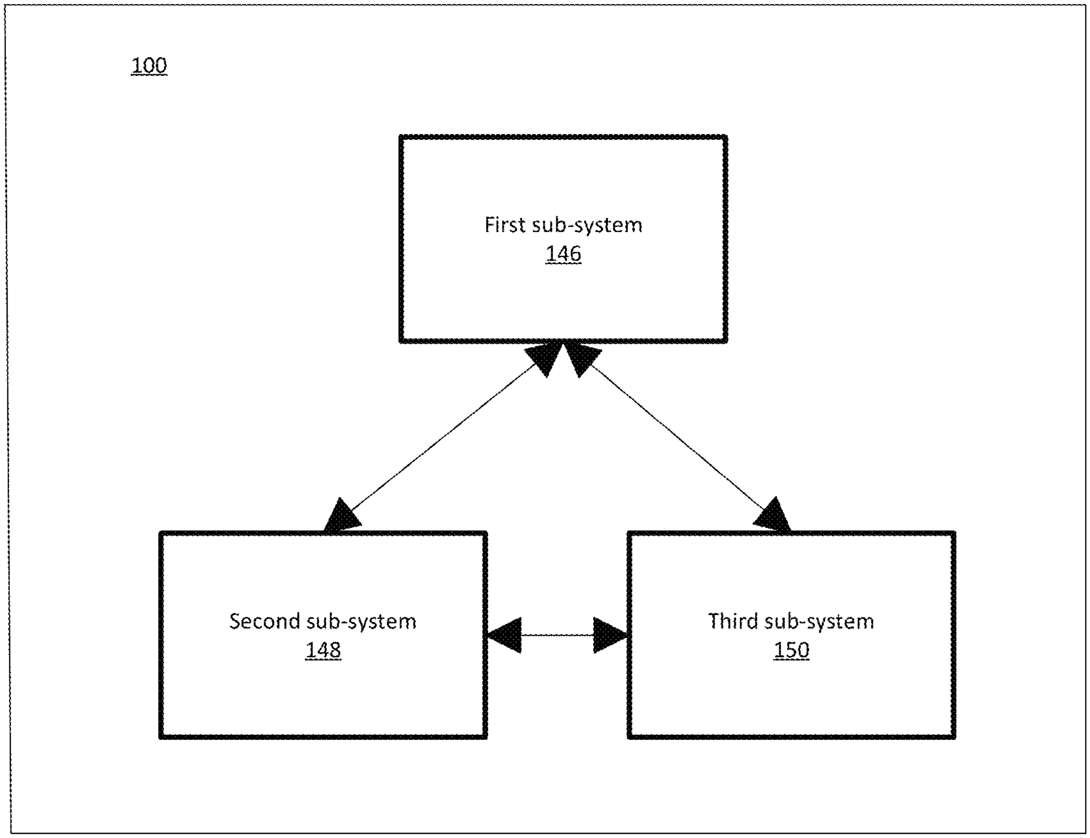
FIG. 1A depicts a system for providing authenticated access to an account that may be used to implement aspects of the disclosed embodiments.

The disclosed embodiments generally relate to sharing, among multiple users, electronic access to a local and/or remote account/service, or segregated portion thereof, operative to collect/store data and/or provide services with respect thereto, e.g. sharing one or more of the ability to send/write/store data, read/receive data, or combinations thereof, perform functions with respect to stored data, such as synchronization, archiving, communication, aggregation, calculations, derivations, transformations, etc., and/or analyze, present or report data, so as to, for example, facilitate collaboration, contribution, distribution, redundancy, etc. of work/effort by the users.

More particularly, the disclosed embodiments relate to a system/process for sharing account access to the local and/or remote service which enables a user to utilize their device, having access to the account, to initiate a process of granting access to the account to another device without having to have knowledge of that device. For example, in one embodiment, the user, e.g. the inviting user, needing no knowledge of another user's device, uses their device, or an instance of an account-access application executed thereby, to generate a unique identifier, e.g. an invitation/invite code, associated with the account, as will be described, which they may share with another user and/or the other user's device, e.g. the invited user. The invitation code is entered into the other user's device, e.g. into an instance of the account-access application executed thereby, to obtain access to the account. The account/service provider provides a back-end process which the inviting user's device may interact with, as will be described, in order to generate the invitation code, e.g. securely, and with which the invited user's device may interact with, as will be described, to provide the invitation code, i.e. "redeem", and enable the account/service provider to provide the requisite account access.

The disclosed technology addresses the need in the art for authenticating user accounts with a content management system. Specifically, the disclosed technology solves a problem that uniquely arises in the fields of computer technology, Internet communications, and networking, where identities of people and devices need to be ascertained and verified digitally. Thus, the disclosed solution is rooted in computer technology in order to overcome a problem specifically arising in the computer networks. Indeed, the subject technology improves the functioning of the computer by allowing it to access an account more easily and more securely.

As used herein, an account refers to a segregated portion of a service that may store data and/or be used to provide a service. The service may be an electronic data storage service, which may be segregated or otherwise compartmentalized, e.g. into "accounts", to restrict access as between users thereof. Access to the account provides access to the stored data and/or service. Different levels of access may be granted to invitees, such as read only, modify only, or read/write. Access to the account may be granted, in whole or in part, based on an attribute of a user of the service and/or more parameters, such as permissions or other metadata, characterizing the account, user, and/or device used to access the service. The service may be implemented by a computer program executing on a processor, such as a processor of a server computer, access to which may be provided via a public and/or private wired and/or wireless electronic communications network to which other devices associated with users of the service, as will be described, are connected, such as the processor 1202 and network 1220 described below with respect to FIG. 12. In one embodiment, the service is provided via one or more server computers coupled with the Internet and may be referred to as a "cloud" service. It will be appreciated that the service may be implemented physically and/or logically remote from and/or local to the devices, which may be referred to as client devices, that access the service. For example, the service may be executed on/provided by one or more of the devices used to access the service. Portions of the service may be executed/provided by the devices while other portions are executed/provided by the server(s), such apportionment being static or dynamic, and/or the service may be entirely executed on/provided by the server(s). In one embodiment, the devices that are used to access the service, which may include desktop or laptop computers, mobile devices such as mobile phones or tablet devices or the like, may execute instances of one or more particular computer software programs, each referred to as an "app" that is/are specifically programmed to provide, enable, or facilitate the functionality described herein. Each installation of an app on a particular device may be referred to as an "instance" of the app. The app may be implemented as a stand-alone program separately executed by the device from other programs executed/executable by the device or may be a program, such as an html5 or "web app", executed or implemented by another program on the device, e.g. a web browser program.

As will be described, the disclosed embodiments recognize a pseudo one to one relationship between a device used to access the account/service, e.g. a mobile device such as a smart phone, tablet, or other device and a particular user and/or a particular role that the user plays, such as within an organization. For example, a mobile telephone or smartphone or other device may belong to a single user, e.g. owned by or provided to that user for their exclusive use. Alternatively or in additional thereto, a device may be provided to a user for a particular purpose, e.g. based on a role that the user plays within an organization, such as a foreman, machine operator, or driver. For example, a particular device may be provided, or otherwise assigned, to whichever user is designated as a foreman during a particular period, such as a work shift. In one implementation, the device may be affixed to a machine, station, or vehicle for use by whichever user is assigned to that machine, station, or vehicle.

The disclosed embodiments facilitate creation of an account by one device, such as through an instance of an app executed thereby and manipulated via interaction with the user of the device, and subsequent access to the created account by that device as well as other select devices as will be described. In particular, the disclosed embodiments facilitate creation of an account in association with a given device and the ability to subsequently use that device to readily grant access to the created account to other devices without, for example, requiring knowledge of those other devices.

As described generally above and in more detail below, once an account is created, such as by a device using an instance of the service-accessing app executing thereon, that device or one already having access to the account, which may be referred to as an inviting device, may be used to enable access to other devices by generating or otherwise providing an account-unique code, which may be referred to as an invitation or invite code, that is provided electronically or otherwise, such as via a user, to another device that may be referred to as an invited device. The code is used by the invited device, such as by an instance of the service-accessing app executing thereon, to enable access to the account therefrom. In this manner, once an account is created, access thereto may be easily granted to other devices.

Embodiments of the present invention may include techniques to associate an application installed on a device with an account as described below, including, but not limited to, unique identification of the particular installed instance of the application or group of installed applications on a particular device, creating an account on a system in association with the application installation, secure communications, associating one or more application installations on other devices with an existing account, associating one or more user credentials with an existing account, associating one or more separate accounts with an existing account, and revoking an account association.

In one embodiment, to associate an instance of an application installation with an account, a unique application installation identifier (UAII) may be used. The UAII may be generated locally by the application instance or obtained from a backend system, described in more detail below, in communication with the application instance. This identifier may be unique to each application installation instance or shared by a group of related applications installed on the same device. It may be desirable that the value of the identifier not be known by the user or any unauthorized software.

To streamline the creation of an account, the application may automatically or with a simple user approval create an account on a system and provide its UAII to the system to associate the application installation with the account.

In this particular embodiment, as the UAII is used to gain admission to the account, it may be desirable to secure any communications where the UAII is transmitted. In one embodiment, such communications may be encrypted using public key cryptography or pre-shared keys (PSK). In one embodiment, all communications between the application and the system operate via a web-based application programming interface (API) over the HyperText Transfer Protocol Secure (HTTPS) protocol. Furthermore, the UAII may be packaged and encrypted in a JavaScript Object Notation Web Token (JWT) along with an expiration date/time, after which the JWT is no longer accepted. The encryption and decryption of the JWT may be controlled using a PSK, where the PSK is known by the application and the system.

In one embodiment, an invitation mechanism may be supported from a mobile, desktop, or web application to support the association of instances of applications installed on other devices with the account. These applications may or may not already be associated with separate accounts. Initiating the invitation mechanism on a device whose instance of an application is already associated with an account may cause a unique access code, such as an invite code, to be generated. The invite code may, for example, be a string of characters or a string of words separated by a separator character, such as a hyphen. The latter has the benefit of reduced transcription error. The invite code may be used to enable account access, i.e. redeemed, on another instance of the application installed on another device, thereby associating that other instance of the application installation with the account. The invite code may then be disabled, i.e. a one-time use code, though in alternative embodiments, the invite code may be redeemable for multiple application installations on other devices, limited to a specific fixed or configurable number of redemptions/users, or unlimited. The invite code may also include an active date before which it may not be redeemed and/or and expiration date/time, after which it may no longer be redeemed.

The communication of the invite code to the new/invited application installation instance may be performed through a variety of mechanisms. It may be simply directly typed into the new application installation instance, e.g. via a user interface provided thereby, by the same user who initiated the invitation. It may be communicated to a new/invited user orally, such as face to face or over an audio medium such as a phone or radio, through electronic messaging such as email, text message, or instant message, removable storage media such as USB storage, or through a physical note, where the receiving user enters the code into the new instance of the application installation on their device, e.g. via a user interface provided thereby.

The communication of the invite code may be performed via an electronic communications network through local private device-to-device communications, such as over a local Wi-Fi network or via NFC or Bluetooth Low Energy. In this case, the application from which the invitation is initiated may search for applications operating on other mobile devices, e.g. which are broadcasting or otherwise electronically making their presence/availability known, and present the user with a list of suitable application instances/devices found. Each listed application instance or device may have some identifying label, such as a user-defined device name. Upon selection of the desired application by the inviting user, an alert, which may or may not comprise the invitation code, may then be presented to the invited application, whereby the invited application user accepts or rejects the invitation. If the invited user accepts the invitation, the invite code may be communicated electronically (if not already communicated via the alert) via the local device-to-device communications channel to avoid the need to manually enter/type the invite code.

The communication of the invite code may be performed by generating a URL/link containing the invite code and sending the link from the inviting device's app to the invited device's app. The link may instruct the device to open the application and provide the application with the invite code. The link may be sent in an email, text message, instant message, or other electronics means. The recipient may open the link from the invited device with the installed application, causing the installed application to open and use the embedded invite code to associate the application with the account. If the recipient does not have the application installed, they may be redirected, e.g. to an "app store" or internet web or ftp site, or otherwise prompted to install it. It is noted that this mode of communicating the invite code may be used once the invite code has been generated and that the inviting user need not know where to direct such a communication at the time the invite code is generated.

The communication of the invite code may be performed using a Quick Response Code (QR Code), barcode, or other machine-readable code or symbols, concealed or not. A human readable text may be displayed on the application or web application from which the invitation is initiated, e.g. via the display thereof. The recipient would then scan the code using, for example, the built-in camera on the invited device running the application instance to be associated with the account. Furthermore, audible or inaudible, such as subsonic or frequencies compatible with telephonic or audio radio communications, communication methods may be used to transmit the invite code from one device to another.

The communication of the invite code may be performed by generating a file containing the invite code and sending the file from the inviting user's app to the invited user's device. The file may be a text file containing the code, an image containing a QR code, or a proprietary binary file containing the information. The file may be sent, for example: as an email attachment or instant messaging attachment; sent using local file sharing, such as Apple's AirDrop; using shared file storage, such as DropBox or Google Drive, or using another form of file transfer protocol now available or later developed. The user of the invited device may then open the file with the application instance to be associated with the account or otherwise transfer the file contents thereto.

In addition to inviting application instances installed on invited devices to the account, it may also be desirable to support account access, e.g. device independent, from a web browser or other client or terminal. In one embodiment, the option to add/associate a traditional username and password or single sign-on credentials may be provided by the invitation mechanism. The account owner or administrator may choose to add user credentials to their account, so that they can recover their information in the case of a lost or damaged device. However, other users in the account would be free to use the system without ever needing to manage a username or password. For security purposes, it may be desirable to limit the ability to create such associations to the original account creator or administrator.

The described embodiments may be used to associate multiple separate accounts together, where each account may have one or more associated installed application instances or user credentials. This may be used in cases where users, already having separate accounts with the service, wish to interact, share data, etc., but the users wish to remain associated with, or otherwise maintain their respective accounts. The invitation mechanism would still result in an invite code being generated and communicated to another user. The redemption of the invite code would then cause the inviting and invited users' respective accounts to be associated, e.g. in order to share data contained therein, etc. In the case that either or both the inviting and invited devices or credentials are associated with multiple accounts, an account selection mechanism would be provided to control which accounts become associated. In this case, the redemption mechanism may include providing the invited user's/device's account identifier to the system.

In the case that an application installation instance or user credentials association should be revoked, a revocation mechanism may be supported. This would allow an administrator to revoke access for a specific application installation instance, user credentials set, or for a specific application installation or user credentials set to initiate the revocation.

The following describes an example of the disclosed embodiments, whereby various users collaborate via mobile devices running one or more specific application programs to provide for collection and/or management of farm related data. Some of these devices collect data, such as quantities of product delivered, loaded or unloaded, from machinery or other sources and, as described above, may be affixed thereto. Other devices may be used by managers and other operators to view data, such as crop yields, and interact with the system. The system allows for the synchronization of this data between devices and for access to it via desktop software and a web-browser. The following describes the account creation and user invitation process using the disclosed embodiments. This example could be easily adapted to other types of systems and is not limited to instant messaging, social networking, project management, document collaboration, or workflow management.

From, for example, a mobile account-access application instance previously installed on the user's mobile device, a new user who wishes to create a new account is either automatically presented, via a user interface, with an option to create a cloud account or initiate the process themselves. The account may also be created automatically without user interaction. The user, who may also be referred to as an administrative user, may choose to provide a contact, recovery email address, or any other contact information. Conversely, the user may choose not to provide any information. The mobile app creates an account with the service and associates a unique application installation identifier (UAII) with the account. Any optional contact information may be provided using the mobile application instance.

If the new/administrative user wishes to invite another user to participate in the account, the administrative user may initiate an invitation process from the mobile application, desktop application, or web application. This causes a unique access code, such as an invite code, to be generated and presented to the inviting user. The code may be either a string of characters or a sequence of words separated by hyphens or some other separator.

The invited user is provided with the unique invite code through some means, such as orally, text message, instant message, or via local device-to-device communications, such as Bluetooth Low Energy (BLE) or Near Field Communications (NFC). The user enters the unique invite code into the mobile app, or the app may automatically capture/enter the unique invite code, such as in the case where the invite code is electronically communicated to the invited device, and, in one embodiment, provided that the user accepts the invitation. The mobile application uses the unique invite code to gain access to the account and associates with the account a UAII to associate the device with the account. Therefore, the user of the device may use the application instance to access the account without the need to remember a username and password.

The following describes another example of the disclosed embodiments for a messaging system where participants wish to remain anonymous and control with whom they communicate. The example case includes three users A, B and C, where A and B wish to communicate. A and C wish to communicate. B and C do not wish to communicate. Each of A, B, and C would install instances of the mobile application on their respective devices and create their own account whereby the UAII for each installed application instance is associated with the respective accounts. A, now wishing to communicate with B, initiates an invitation, which results in an invite code being sent to B orally, or otherwise as described herein, in order to maintain privacy. B redeems the invite code, which results in A's and B's accounts becoming associated and facilitates communication, as described herein. C follows the same process, which results in A's and C's accounts becoming associated. However, no communication between B and C is facilitated since neither B or C initiate an invitation with each other.

Herein, the phrase "coupled with" is defined to mean directly connected to or indirectly connected through one or more wired and/or wirelessly connected intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group including A, B, . . . and N, that is to say, any combination of one or more of the elements A, B, . . . or N including any one element alone or in combination with one or more of the other elements which may also include, in combination, additional elements not listed.

FIG. 1A depicts a system 100, according to one embodiment, for providing authenticated access to an account provided by a service. According to one embodiment, the system 100 is implemented as part of the agricultural data management system described above. The service may be a local or remote service, i.e. the service may be provided by a device, such as a mobile device, e.g. the inviting device described below, or provided via a remote system/server which may be accessed, such as via an electronic communications network, by a device, such as a mobile or desktop device, e.g. the inviting device described below. The disclosed embodiments are preferably implemented with computer devices and computer networks, such as those described below with respect to FIG. 12 and improved as described herein, that allow users, e.g. members or participants, secure and convenient authenticated account access to multiple devices. It will be appreciated that the plurality of entities utilizing the disclosed embodiments may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another participant and/or the system 100.

In particular, FIG. 1A depicts a block diagram of a system 100, which may also be referred to as an architecture, for providing authenticated account access to multiple devices. The system 100 generally includes a server or other backend which provides a service to devices via accounts as described, devices used to create accounts, and/or invite other devices to join those accounts, referred to as inviting devices, as described, and devices which are invited to join accounts, i.e. invited devices, as described, all of which form the system 100 as described herein. The system 100 may be functionally referred to or otherwise described as including several sub-systems, i.e., a first sub-system 146, a second sub-system 148, and a third sub-system 150, which interact as described herein to achieve the described functionality. It will be appreciated that, depending upon the implementation, the system 100 may, in fact, be implemented with fewer or more sub-systems, and/or a given device may be a part of one or more of the sub-systems 146, 148, 150, e.g. a given device may first be an invited device and later be an inviting device, a given device may be an inviting device and provide the accounts/service, etc.

Figure 1B:
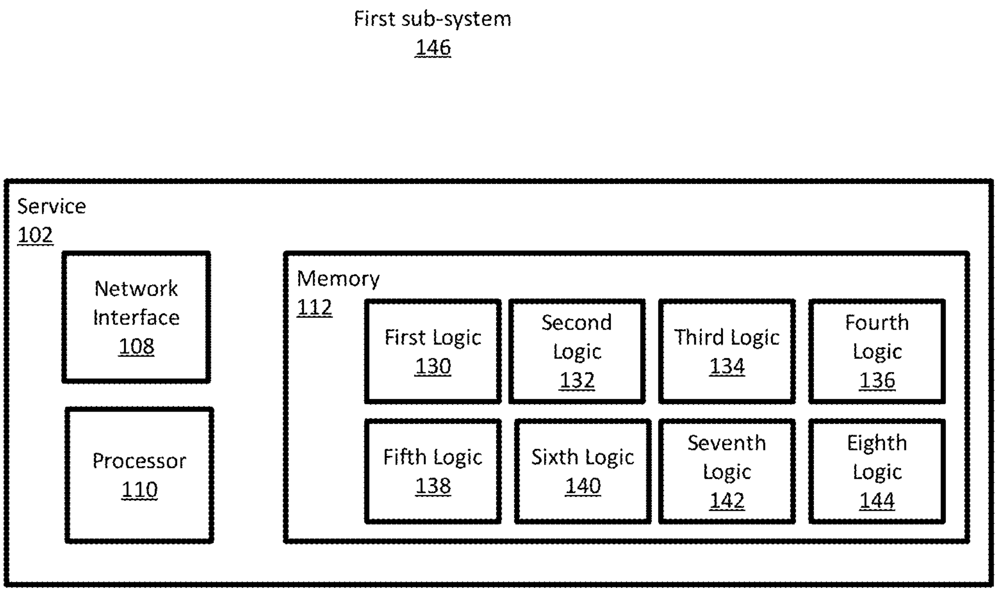
FIG. 1B shows a more detailed diagram of the first sub-system shown in FIG. 1A according to one embodiment.

FIG. 1B shows an example of the first sub-system 146 for the system 100 of FIG. 1A, which, in one embodiment, may be implemented by a server or other computer, such as a cloud computing service. In this embodiment, one or more accounts, as described herein, may be provided by a service 102 implemented by the first sub-system 146 and which stores data for and/or provides a service to or on behalf of users via the one or more accounts. Authenticated access to a particular account provides access, complete or limited/partial, to the stored data and/or service. In one embodiment, the first sub-system 146, and/or service 102 implemented thereby, includes at least one processor 110, at least one memory 112 coupled with the at least one processor 110 and at least one network interface 108 coupled with the at least one processor 110 and/or at least one memory 112.

Figure 1C:
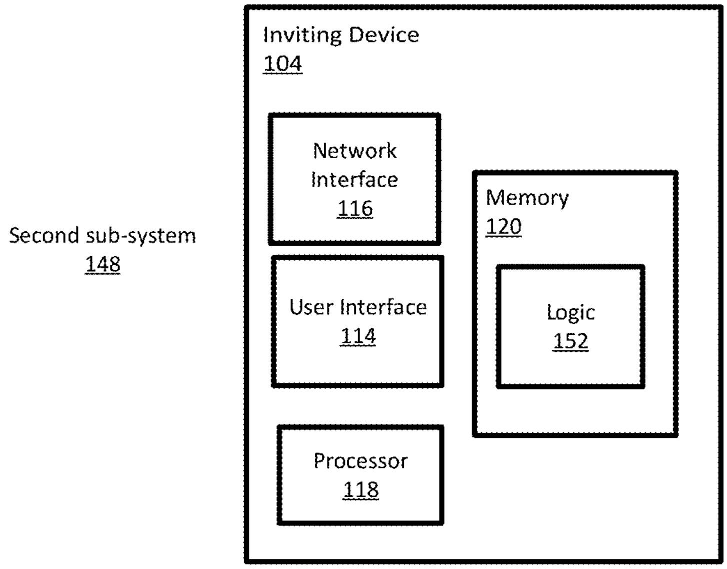
FIG. 1C shows a more detailed diagram of the second sub-system shown in FIG. 1A according to one embodiment.

FIG. 1C shows an example of the second sub-system 148 for the system 100 of FIG. 1A, which, in one embodiment, may be implemented by one or more inviting devices operating, as described, to invite other devices to access one or more accounts of the service 102 associated with the inviting devices. Each inviting device 104 includes a processor 118, a memory 120 coupled with the processor 118, a network interface 116 coupled with the processor 118 and/or memory 120, and a user interface 114 coupled with the processor 118 and/or memory 120. The inviting device 104 further includes computer program logic 152 stored in the memory 120 of the inviting device 104 and executable by the processor 118 of the inviting device 104.

Figure 1D:
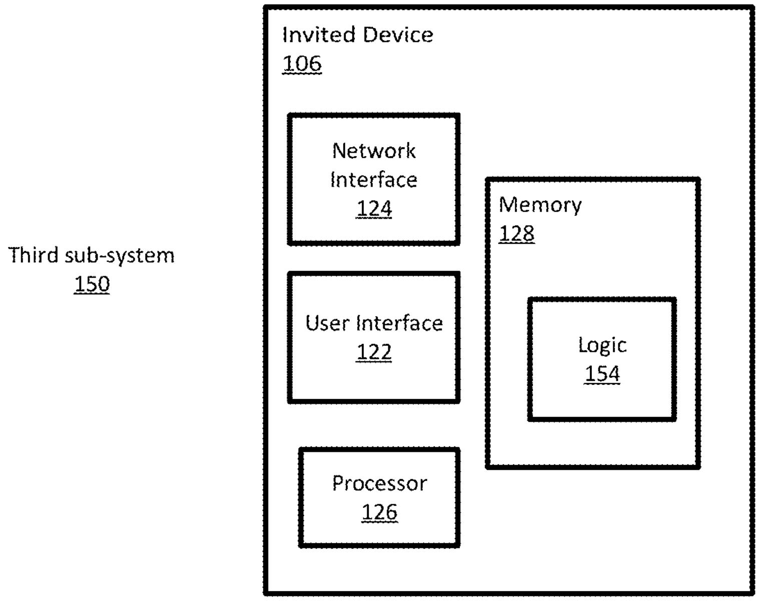
FIG. 1D shows a more detailed diagram of the third sub-system shown FIG. 1A according to one embodiment.

FIG. 1D shows an example of the third sub-system 150 for the system 100 of FIG. 1A which, in one embodiment, may implemented by one or more invited devices operating, as described, to receive and act upon invitations to access one or more accounts. Each invited device 106 includes a processor 126, a memory 128 coupled with the processor 126, a network interface 124 coupled with the processor 126 and/or memory 128, and a user interface 122 coupled with the processor 126 and/or memory 128. The invited device 106 further includes computer program logic 154 stored in the memory 128 of the invited device 106 and executable by the processor 126 of the invited device 106.

Referring to FIGS. 1A-D, the first sub-system 146 may further include computer program logic 130, which may be referred to herein as first computer program logic 130, stored in the memory 112 of the service 102 and executable by the processor 110 of the service 102 to cause the processor 110 to receive, via the network interface 108 of the service 102, a request to enable another device to have access to an account provided by the service 102. The request may be sent from the processor 118 of the inviting device 104 using the network interface 116 of the inviting device 104 coupled to the processor 118. The request being communicated via an electronic communications network, such as the internet, and not identifying the invited device. The request may be initiated by an inviting user (not shown) inputting a command with a user interface 114 of the inviting device 104. The processor 118 of the inviting device 104 may initiate an invite action when the request is received by the processor 118.

In one embodiment, the invite action is initiated via an application executed by the processor 118 of the inviting device 104. The inviting device 104 and the invite device 106 may be one of a mobile device, a computer, a tablet device, or the like.

In another embodiment, the request is encrypted for security purposes. A unique identifier may be associated to a device with authenticated access to the account and stored in a memory of that device, such as the memory 120 of the inviting device 104. The request may include the unique identifier and be encrypted using a public key of a private/public key pair, such as a public key provided by the service, the private key held thereby. The public key of the service may be stored in a memory of the device with authenticated access, such as the memory 120 of the inviting device 104, and may be validated, prior to use, as belonging to the service, such as via a certificate authority. Alternatively or in addition thereto, the request may be signed using a private key held by the inviting device, which may be stored in a memory of the device with authenticated access, such as the memory 120 of the inviting device 104. The public key corresponding to the signing private key and associated with the unique identifier may be stored in the memory 112 of the service 102. The request may be encrypted with the service's public key at the same time it is signed with the device's private key. The processor 110 of the service 102 may decrypt the request using its private key and subsequently find the device's public key stored in its memory 112 using the unencrypted unique identifier. The processor 110 of the service 102 may use the public key to decrypt the encrypted request received to further authenticate the signature and request.

The first sub-system 146 may further include computer program logic 132, which may be referred to herein as second computer program logic 132 and, depending upon the implementation, may be part of the computer program logic discussed above or otherwise coupled therewith, stored in the memory 112 of the service 102 and executable by the processor 110 of the service 102 to cause the processor 110 to generate an invite code. The invite code is operable to identify the account and to indicate that a device communicating the invite code to the service 102 is authorized to access the account.

In one embodiment, the invite code may be generated by an application stored in the memory 120 of the inviting device 104 and executable by the processor 118 of the inviting device 104.

In another embodiment, the invite code may be a text string, such as an Uniform Resource Locator (URL) and/or alphanumeric code. The text string may be comprehensible and capable of being communicated between users.

The system 100 further includes computer program logic 134, which may be referred to herein as third computer program logic 134 and, depending upon the implementation, may be part of the computer program logic discussed above or otherwise coupled therewith, stored in the memory 112 of the service 102 and executable by the processor 110 of the service 102 to cause the processor 110 to communicate the invite code to the processor 118 of the inviting device 104. The invite code may be communicated using the network interface 108 of the service 102 and the network interface 116 of the inviting device 104 via the electronic communications network.

The first sub-system 146 may further include computer program logic 136, which may be referred to herein as fourth computer program logic 136 and, depending upon the implementation, may be part of the computer program logic discussed above or otherwise coupled therewith, stored in the memory 112 of the service 102 and executable by the processor 110 of the service 102 to cause the processor 110 to receive the invite code from the processor 126 of the invited device 106. The invite code is provided to the invited device 106 from the inviting device 104. The invite code may be received by the processor 110 of the service 102 using the network interface 108 of the service 102 and the network interface 124 of the invited device 106 via the electronic communications network.

In one embodiment, the invite code may be provided to the invited device 106 from the inviting device 104 via audible communication. For example, a user (not shown) of the inviting device 104 may communicate the invite code orally to a user (not shown) of the invited device 106, where the user of the invited device 106 inputs the invite code into the invited device 106 using the user interface 122 of the invited device 106. The inviting device 104 may electronically annunciate the invite code to the user of the invited device 106. The user of the invited device 106 or the user of the inviting device 104 may orally communicate the invite code directly to an audio sensor (not shown) of the invited device 106, which recognizes the invite code via voice recognition. The invite code may be communicated via direct device-to-device communication using sound, whether perceptible to human or not.

In an embodiment, the invite code may be provided to the invited device 106 from the inviting device 104 via an electronically communicated message. Electronically communicated messaging may include short messaging service (SMS), multi-media messaging service (MMS), instant message (IM), electronic mail (email), BlackBerry messaging (BBM), etc., wired and/or wireless networks, direct device-to-device communication, via an intermediate device, and/or via an electronic communications network.

In an embodiment, the invite code may be provided to the invited device 106 from the inviting device 104 via optical communication. Optical communication may include cover barcode, quick response code (QR code), a display presenting an alphanumeric code, such as the user interface 114 of the inviting device 104 or the user interface 122 of the invited device 106, and/or anything that can be read by an optical sensor of the invited device 106.

In an embodiment, the invited code may be provided to the invited device 106 from the inviting device 104 via an application executed by the processor 118 of the inviting device 104.

In another embodiment, the invite code may be communicated to the service 102 by an application stored in the memory 128 of the invited device 106 and executable by the processor 126 of the invited device 106.

The first sub-system 146 may further include computer program logic 138, which may be referred to herein as fifth computer program logic 138 and, depending upon the implementation, may be part of the computer program logic discussed above or otherwise coupled therewith, stored in the memory 112 of the service 102 and executable by the processor 110 of the service 102 to cause the processor 110 to enable access to the invited device 106 to the account based on the received invite code. The access includes access to the data stored in the account.

In an embodiment, the first sub-system 146 may further include computer program logic 140, which may be referred to herein as sixth computer program logic 140 and, depending upon the implementation, may be part of the computer program logic discussed above or otherwise coupled therewith, stored in the memory 112 of the service 102 and executable by the processor 110 of the service 102 to cause the processor 110 to generate a verification code, subsequent the communication of the invite code to the inviting device 104 and prior to the enabling access.

In an embodiment, the verification code may be generated by an application executed by the processor 126 of the invited device 106.

In another embodiment, the verification code may be a text string.

In an embodiment, the first sub-system 146 may further include computer program logic 142, which may be referred to herein as seventh computer program logic 142 and, depending upon the implementation, may be part of the computer program logic discussed above or otherwise coupled therewith, stored in the memory 112 of the service 102 and executable by the processor 110 of the service 102 to cause the processor 110 to communicate the verification code to the invited device 106. The verification code may be communicated using the network interface 108 of the service 102 and the network interface 124 of the invited device 106 via the electronic communications network.

In an embodiment, the first sub-system 146 may further include computer program logic 144, which may be referred to herein as eighth computer program logic 144 and, depending upon the implementation, may be part of the computer program logic discussed above or otherwise coupled therewith, stored in the memory 112 of the service 102 and executable by the processor 110 of the service 102 to cause the processor 110 to receive the verification code from the inviting device 104. The verification code may be received using the network interface 108 of the service 102 and the network interface 116 of the inviting device 104 via the electronic communications network. The verification code may be provided to the inviting device 104 from the invited device 106. The service 102 may be operable to enable access to the invited device 106 to the account and/or the data stored in the account when the verification code is received by the service 102.

In an embodiment, the verification code includes a notification displayed on the user interface 114 of the inviting device 104 that alerts the user of the inviting device 104 that the invite code has been received by the processor 110 of the service 102. In response to the alert, the user may use the user interface 114 of the inviting device 104 to confirm that the device that sent the invite code to the processor of the service 102 should have access to the account.

In an embodiment, the verification code is provided to the inviting device 104 from the invited device 106 by presenting the verification code optically and/or audibly.

In another embodiment, the verification code is provided to the inviting device 104 from the invited device 106 by transmitting the verification code in an electrically communicated message.

Figure 2:
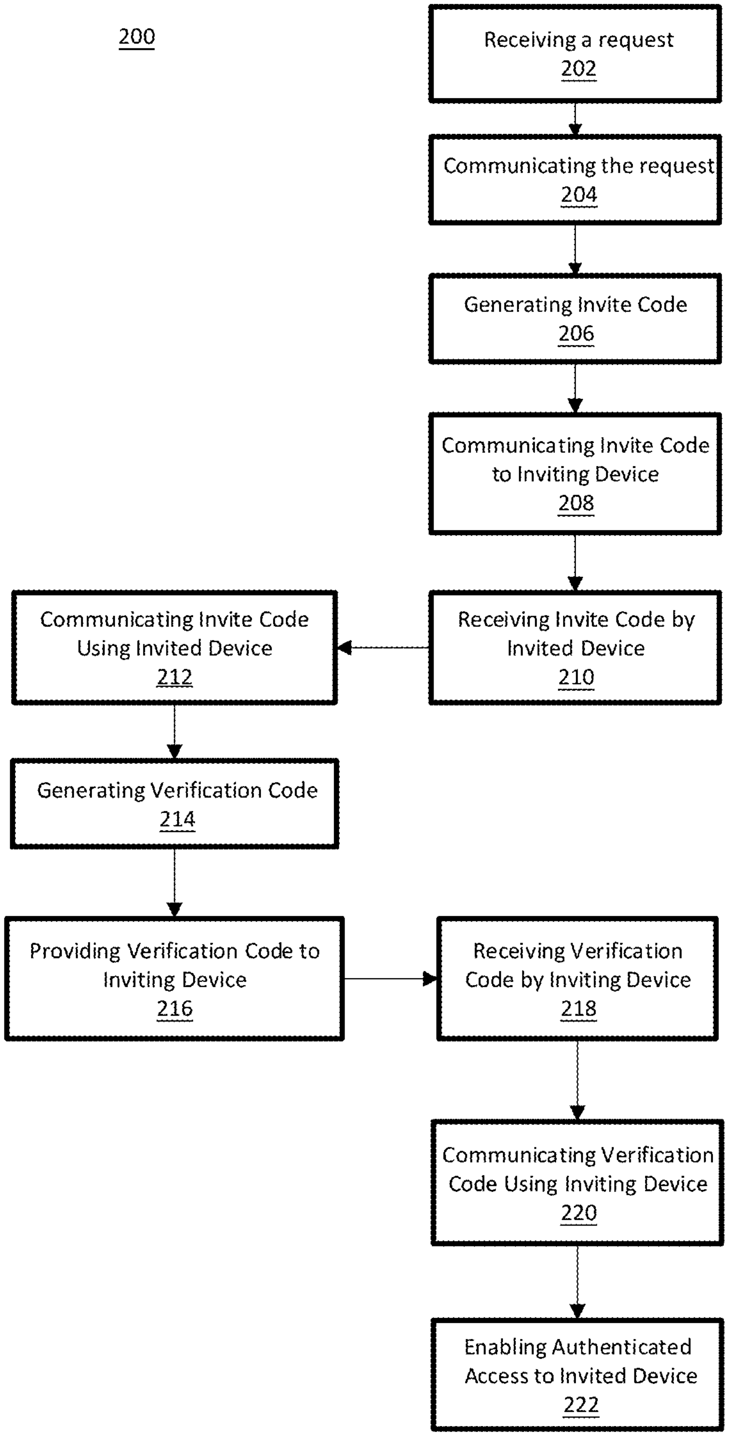
FIG. 2 depicts a flow chart showing operation of the system of FIG. 1.

Referring to FIG. 2, a flow chart showing operation of the system of FIGS. 1A-D according to an embodiment is shown. In particular, FIG. 2 shows a computer implemented method for providing authenticated account access to multiple devices, the account provided by a service 102 and storing data and/or providing a service. Authenticated access to the account provides access to the stored data and/or service. The system includes the service 102, an inviting device 104, and an invited device 106. The service includes a processor 110, a memory 112 coupled with the processor 110 and a network interface 108 coupled with the processor 110 and/or memory 112. The service 102 further includes computer program logic 130-144 stored in the memory 112 of the service 102 and executable by the processor 110 of the service 102. The inviting device 104 includes a processor 118, a memory 120 coupled with the processor, a network interface 116 coupled with the processor 118 and/or memory 120, and a user interface 114 coupled with the processor 118 and/or memory 120. The inviting device 104 further includes computer program logic 152 stored in the memory 120 of the inviting device 104 and executable by the processor 118 of the inviting device 104. The invited device 106 includes a processor 126, a memory 128 coupled with the processor, a network interface 124 coupled with the processor 126 and/or memory 128, and a user interface 122 coupled with the processor 126 and/or memory 128. The invited device 106 further includes computer program logic 154 stored in the memory 128 of the invited device 106 and executable by the processor 126 of the invited device 106.

The operation of the system 100 includes: receiving, by a processor 118 of the inviting device 104, a request to enable another device to have access to the service account, the request not identifying the device to be invited [Block 202]; communicating the request by the processor 118 of the inviting device 104 to the service 102 via an electronic communications network coupled therebetween [Block 204]; generating, by a processor 110 of the service 102 based on the received request, an invite code operable to identify the account and to indicate that a device communicating the invite code thereto is authorized to access the account [Block 206]; communicating, by the processor 110 of the service 102 via the electronic communications network, the invite code to a processor 118 of the inviting device 104 [Block 208]; receiving the invite code by a processor 126 of the invited device 106, the invite code provided from the inviting device 104 to the invited device 106 [Block 210]; communicating, by the processor 126 of the invited device 106, the received invite code to the processor 110 of the service 102 via the electronic communications network [Block 212]; generating a verification code by the processor 126 of the invited device 106 [Block 214]; providing the verification code to the inviting device 104 from the invited device 106 [Block 216]; receiving the verification code by the processor 118 of the inviting device 104 [Block 218]; communicating, by the processor 118 of the inviting device 104, the verification code to the service 102 via the electronic communications network [Block 220]; and enabling, by the processor 110 of the service 102, access to the invited device 106 to the account and the data stored in the account when the verification code is received [Block 222].

Figure 3:
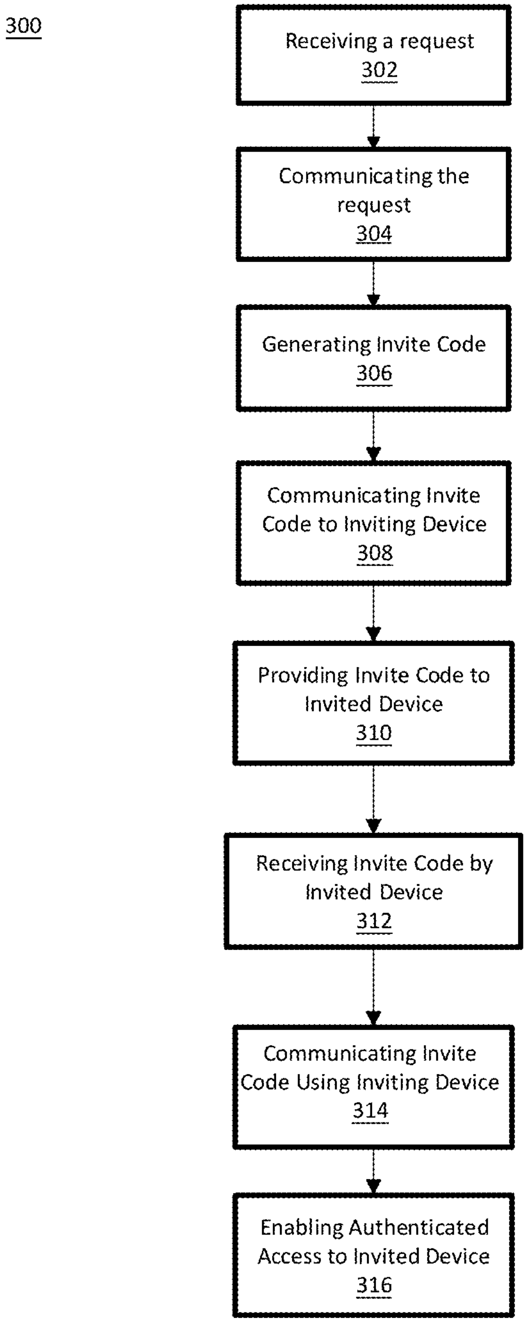
FIG. 3 depicts a flow chart showing operation of the system of FIG. 1.

Referring to FIG. 3, a flow chart showing operation of the system of FIG. 1A-D according to an embodiment is shown. In particular, FIG. 3 shows a computer implemented method for providing authenticated account access to multiple devices, the account provided by a service 102 and storing data and/or providing a service. Authenticated access to the account provides access to the stored data and/or service. The system includes the service 102, an inviting device 104, and an invited device 106. The service includes a processor 110, a memory 112 coupled with the processor and a network interface 108 coupled with the processor 110 and/or memory 112. The service 102 further includes computer program logic 130-144 stored in the memory 112 of the service 102 and executable by the processor 110 of the service 102. The inviting device 104 includes a processor 118, a memory 120 coupled with the processor, a network interface 116 coupled with the processor 118 and/or memory 120, and a user interface 114 coupled with the processor 118 and/or memory 120. The inviting device 104 further includes computer program logic 152 stored in the memory 120 of the inviting device 104 and executable by the processor 118 of the inviting device 104. The invited device 106 includes a processor 126, a memory 128 coupled with the processor, a network interface 124 coupled with the processor 126 and/or memory 128, and a user interface 122 coupled with the processor 126 and/or memory 128. The invited device 106 further includes computer program logic 154 stored in the memory 128 of the invited device 106 and executable by the processor 126 of the invited device 106.

The operation of the system 100 includes: receiving, by a processor 118 of the inviting device 104, a request to enable another device to have access to the service account, the request not identifying the device to be invited [Block 302]; communicating the request by the processor 118 of the inviting device 104 to the service 102 via an electronic communications network coupled therebetween [Block 304]; generating, by a processor 110 of the service 102 based on the received request, an invite code operable to identify the account and to indicate that a device communicating the invite code thereto is authorized to access the account [Block 306]; communicating, by the processor 110 of the service 102 via the electronic communications network, the invite code to a processor 118 of the inviting device 104 [Block 308]; providing the invite code from the inviting device 104 to the invited device 106 [Block 310]; receiving the invite code by a processor 126 of the invited device 106 [Block 312]; communicating, by the processor 126 of the invited device 106, the received invite code to the processor 110 of the service 102 via the electronic communications network [Block 314]; and enabling, by the processor 110 of the service 102, access to the invited device 106 to the account and the data stored in the account based on the received invite code [Block 316].

Figure 4:
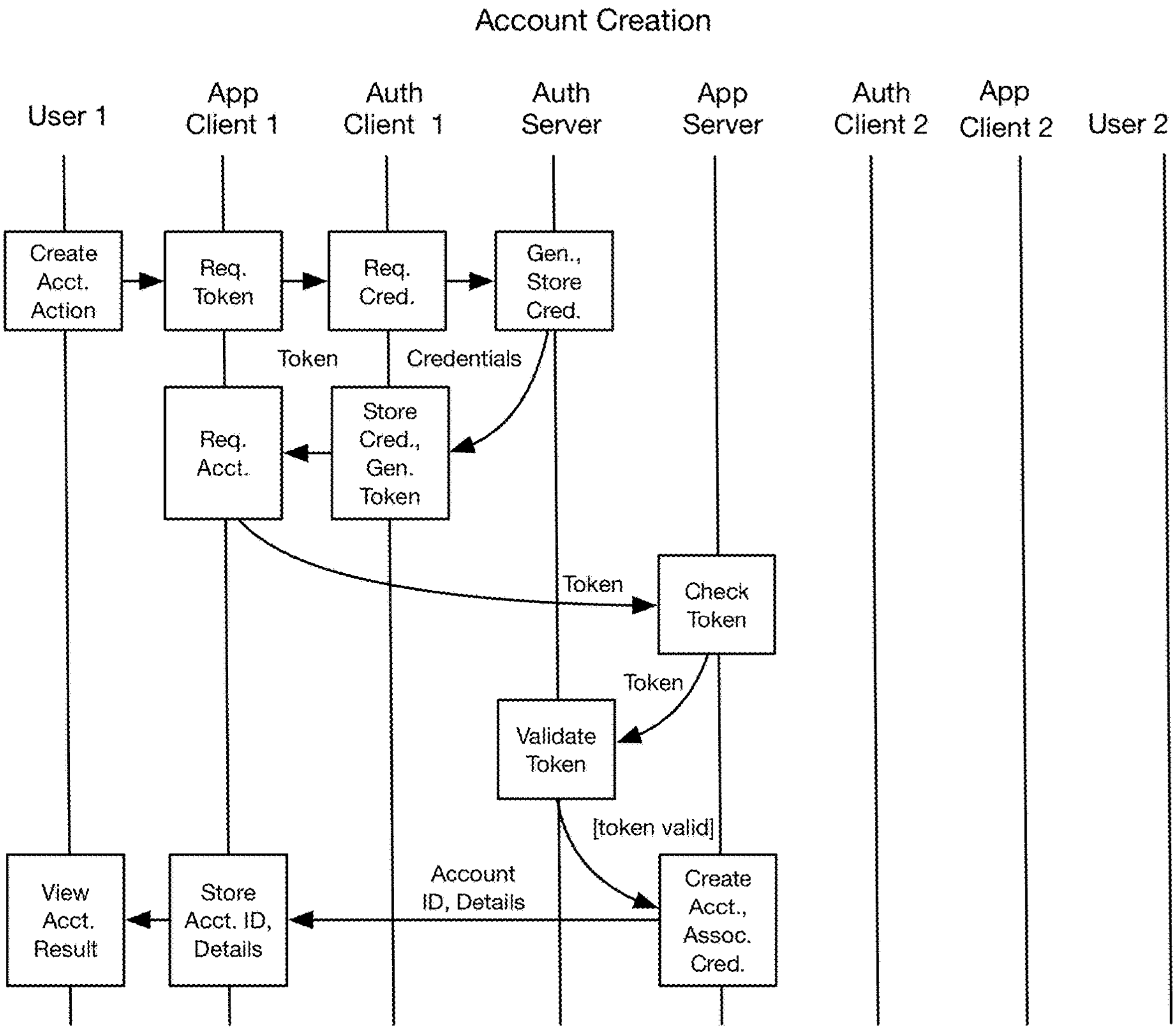
FIG. 4 shows an example of account creation, which may be used by the system of FIG. 1.

Referring to FIG. 4, an illustrative embodiment of account creation using the system 100 from FIGS. 1A-D is shown. A user initiates the create account action using the user interface 114 of the inviting device 104. The app client, which is the client application software that may be stored in the memory 120 of the inviting device 104, is executable by the processor 118 of the inviting device 104 to request an authentication token from the auth client. The auth client may be stored in the memory 120 of the inviting device 104 and is software executable by the processor 118 to communicate with the auth server and generate authentication (auth) tokens. The auth server may be stored in a memory 112 of the service 102 and is executable by the processor 110 of the service 102 to generate credentials when requested by the auth client. The auth server generates a set of credentials, stores them in the memory 112 of the service 102, and sends them back to the auth client. In addition, the auth client may already have credentials, and/or the auth client may generate the credentials itself. The auth client stores the credentials in the memory 120 of the inviting device 104 and uses the credentials to generate an auth token. The app client receives the auth token from the auth client and uses the auth token to make an account create request to an app server. The app server may be stored in the memory 112 of the service 102 and is executable by the processor 110 of the service 102 to validates the auth token by passing the auth token to the auth server for validation. If the auth token is valid, the app server creates the account and associates the account to the credentials extracted from the auth token. If the account is created, the details of the account are sent back to the app client and a confirmation is displayed to the user of the inviting device 104.

Credentials may be a public/private key pair and a unique user identifier, where the identifier and public key are stored together in a central secure datastore, such as in the memory 112 of the service 102. The auth client is the only place the private key is kept. When the user wants to generate an auth token, the auth client may use the identifier, an expiration date, and/or a "not valid before" date as payload. The payload is signed with the private key. This signed payload may be the auth token and can be validated by retrieving the public key associated with the identifier in the auth token, validating the signature, and determining whether the auth token has expired or is not yet valid. Other implementations are possible and could use, for example, a pre-shared key for signing and validating. Using public/private keys is preferred, as a hack of the central datastore would not allow an unauthorized user to generate auth tokens, as the private key only exists on the auth client.

Figure 5:
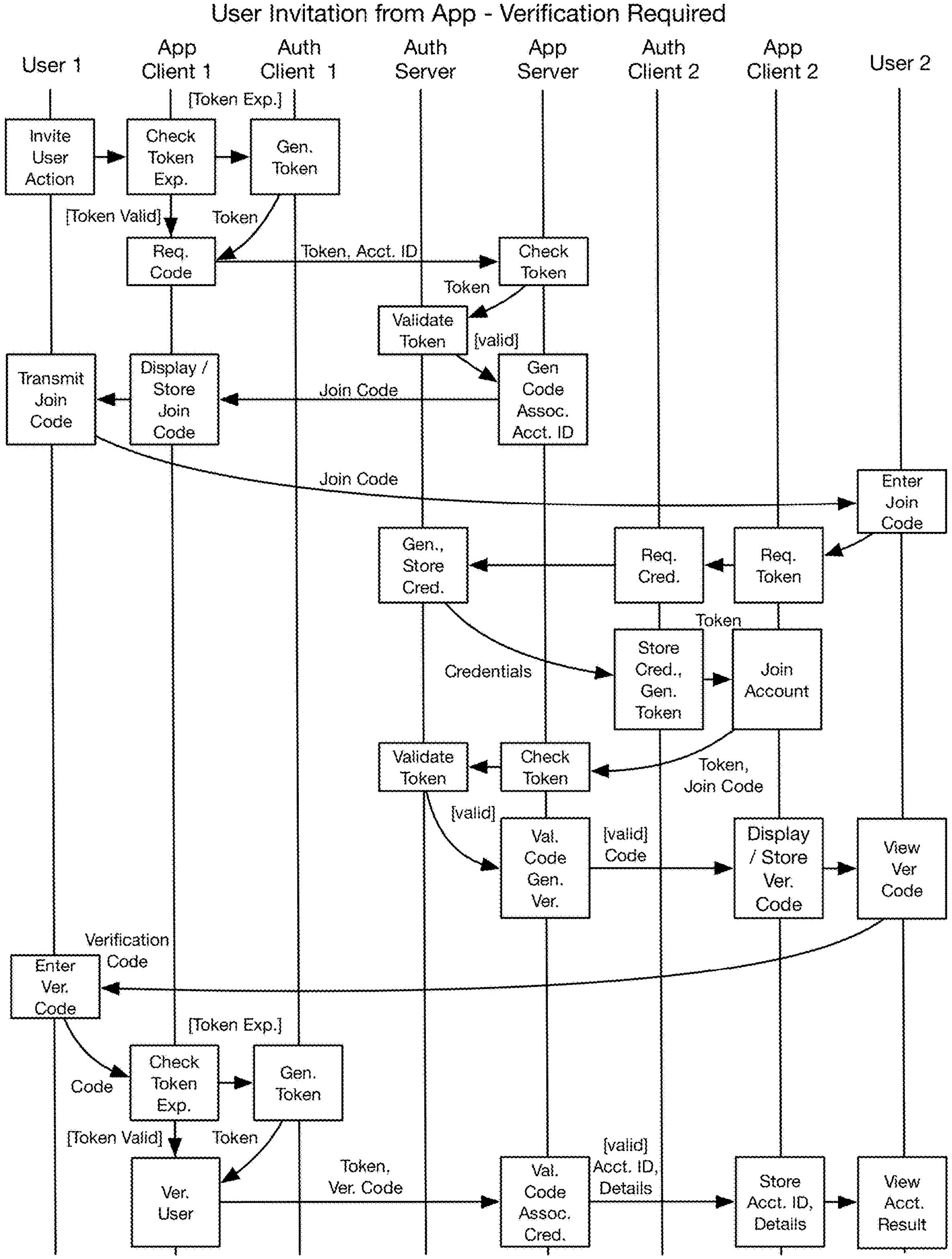
FIG. 5 shows an example of user invitation from a mobile application requiring verification, which may be used by the system of FIG. 1 operating according to FIG. 2.

Referring to FIG. 5, an illustrative embodiment of user invitation from a mobile application requiring verification using the system 100 from FIG. 1A-D and operating according to FIG. 2 is shown. The inviting user initiates the invite user action using the user interface 114 of the inviting device 104. The inviting app client, which may be stored in the memory 120 of the inviting device 104 and is executable by the processor 118 of the inviting device 104, requests a new auth token from the auth client if the auth token has expired. The inviting app client requests an invite code in association with an account identifier from the app server using the auth token via an electronic communications network using the network interface 116 of the inviting device 104. The app server validates the auth token by passing the auth token to the auth server for validation. If the auth token is valid and the inviting user is a member of the account with permission to invite users, the server generates an invite code, which is associated with the account. The app server uses the network interface 108 of the service 102 to send the invite code to the app client via the electronic communications network. The app client displays the invite code using the user interface 114 of the inviting device 104. The inviting user communicates the invite code to an invited user audibly, optically, and/or electronically, such as by voice, text, email, QR code, etc. The invited user enters the invite code using the user interface 122 of the invited device 106. Alternatively, the inviting user that initiated the invite user action may also enter the invite code using the user interface 122 of the invited device 106. The invited app client, which may be stored in a memory 128 of the invited device 106 and executable by a processor 126 of the invited device 106, requests an auth token using the same process as the account creation as discussed above. The invited app requests to join the account by using the network interface 122 of the invited device 106 to provide the auth token and invite code to the app server via the electronic communications network. The app server validates the auth token by passing the auth token to the auth server for validation. If the auth token is valid, the app server validates the invite code and generates a verification code, if the invite code is valid. The invited app client displays the verification code using the user interface 122 of the invited device 106. The invited user communicates the verification code to the inviting user audibly, optically, and/or electronically, such as by voice, text, email, QR code, etc. The inviting user enters the verification code using the user interface 114 of the inviting device 104. The inviting app checks and optionally refreshes the auth token if the auth token is expired. The inviting app uses the network interface 116 of the inviting device 104 to provide the auth token and verification code to the app server via the electronic communications network. The app server validates the auth token (not shown in FIG. 5 the second time), validates the verification code, and associates the new credentials with the account if valid. The invited app client presents the result to the invited user using the user interface 122 of the invited device 106. Accordingly, the invited user is granted access to the account.

Figure 13:
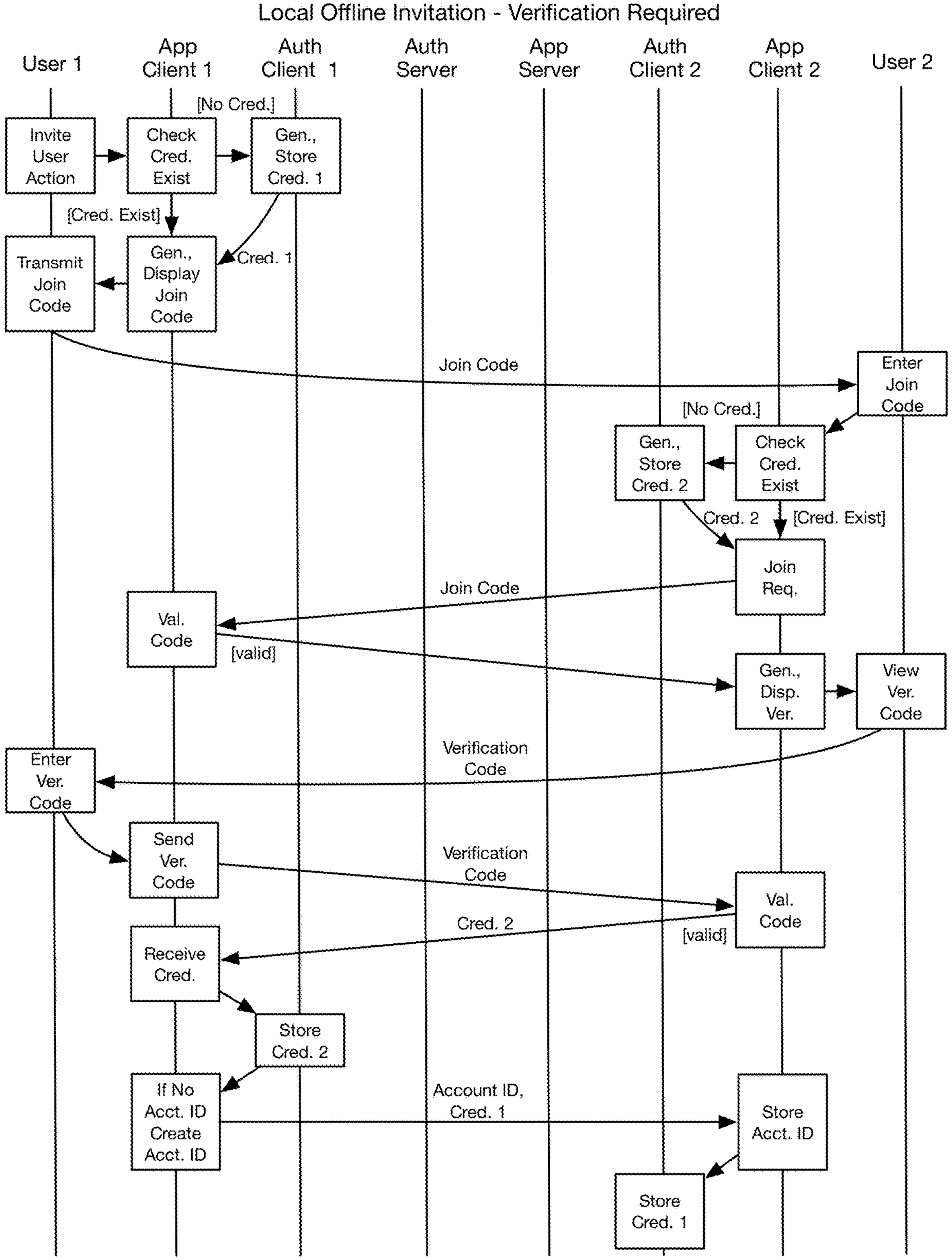
FIG. 13 shows an example of a local offline invitation with verification, which may be used by the system of FIG. 1 operating according to FIG. 2.

Referring to FIG. 13, an illustrative embodiment of offline user invitation from a mobile application requiring verification using the system 100 from FIG. 1A-D and operating according to FIG. 2 is shown. This embodiment is the same as the embodiment of user invitation from a mobile application requiring verification, as described above and shown in FIG. 5, except this embodiment allows the inviting device 104 to invite the invited device 106 to communicate without requiring connection to the server. The inviting device 104 may or may not have already created an account. If the inviting device 104 has not created the account, the inviting device 104 will create a globally unique account identifier. The inviting device 104 and the invited device 106 exchange credentials to validate each other's auth tokens. The credentials may include device identifiers and public keys, although other credentials may include other forms. Exchanging device identifiers and public keys avoids exchanging private keys. This requires that the devices create their own public/private key pair, rather than being created by the auth server. Other embodiments showing the credentials being created by the auth server discussed herein could be altered to have the devices create the credentials instead. Not requiring the private key to be sent enhances security.

Figure 6:
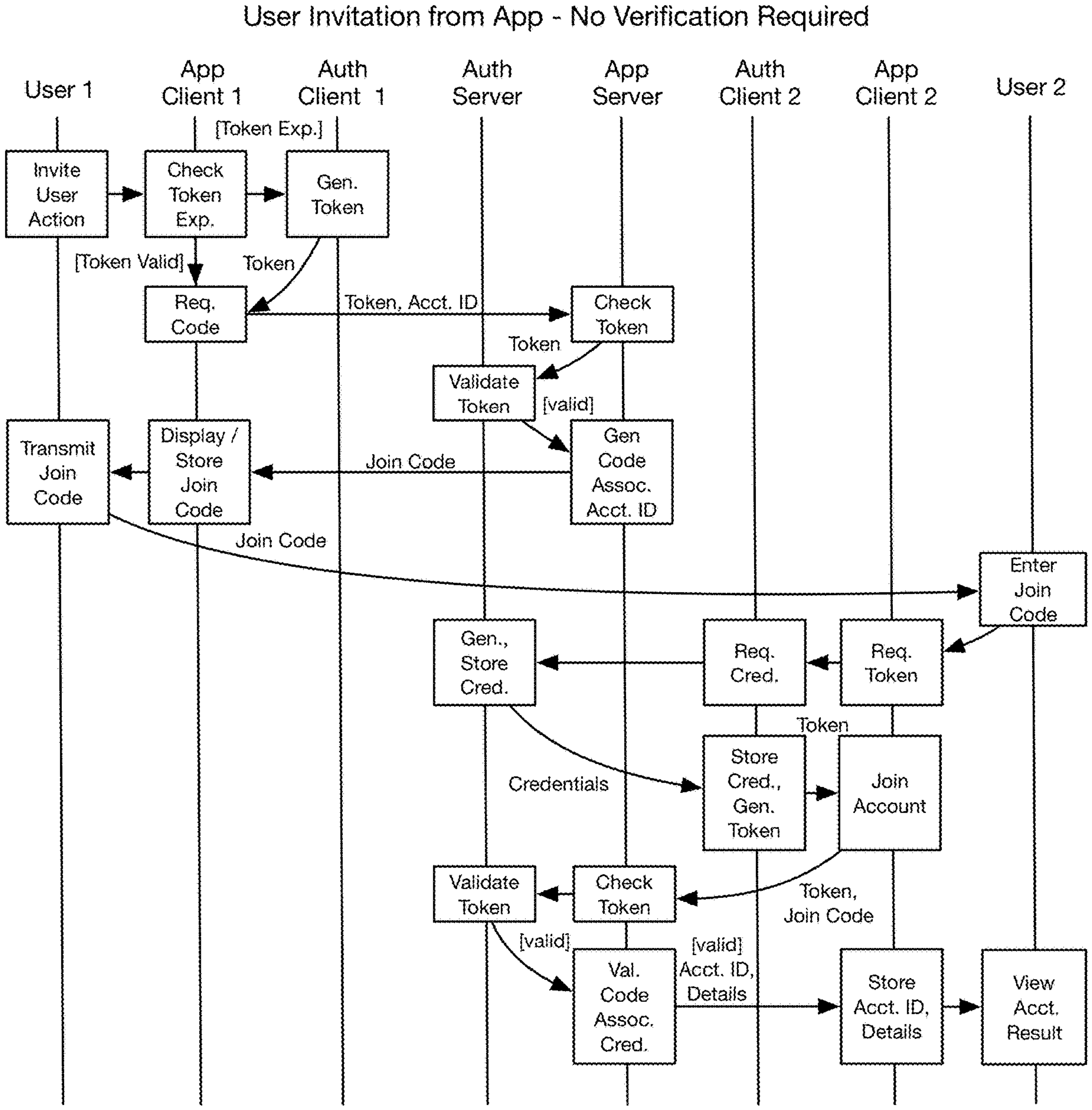
FIG. 6 shows an example of user invitation from a mobile application, which may be used by the system of FIG. 1.

Referring to FIG. 6, an illustrative embodiment of user invitation from a mobile application without requiring verification using the system 100 from FIGS. 1A-D is shown. This embodiment is the same as the embodiment of user invitation from a mobile application requiring verification, as described above and shown in FIG. 5, except for the verification steps. Accordingly, the invited user is granted access and has the new credentials associated to the account when the invited app requests to join an account by providing the valid auth token and invite code to the app server via the electronic communications network.

Figure 14:
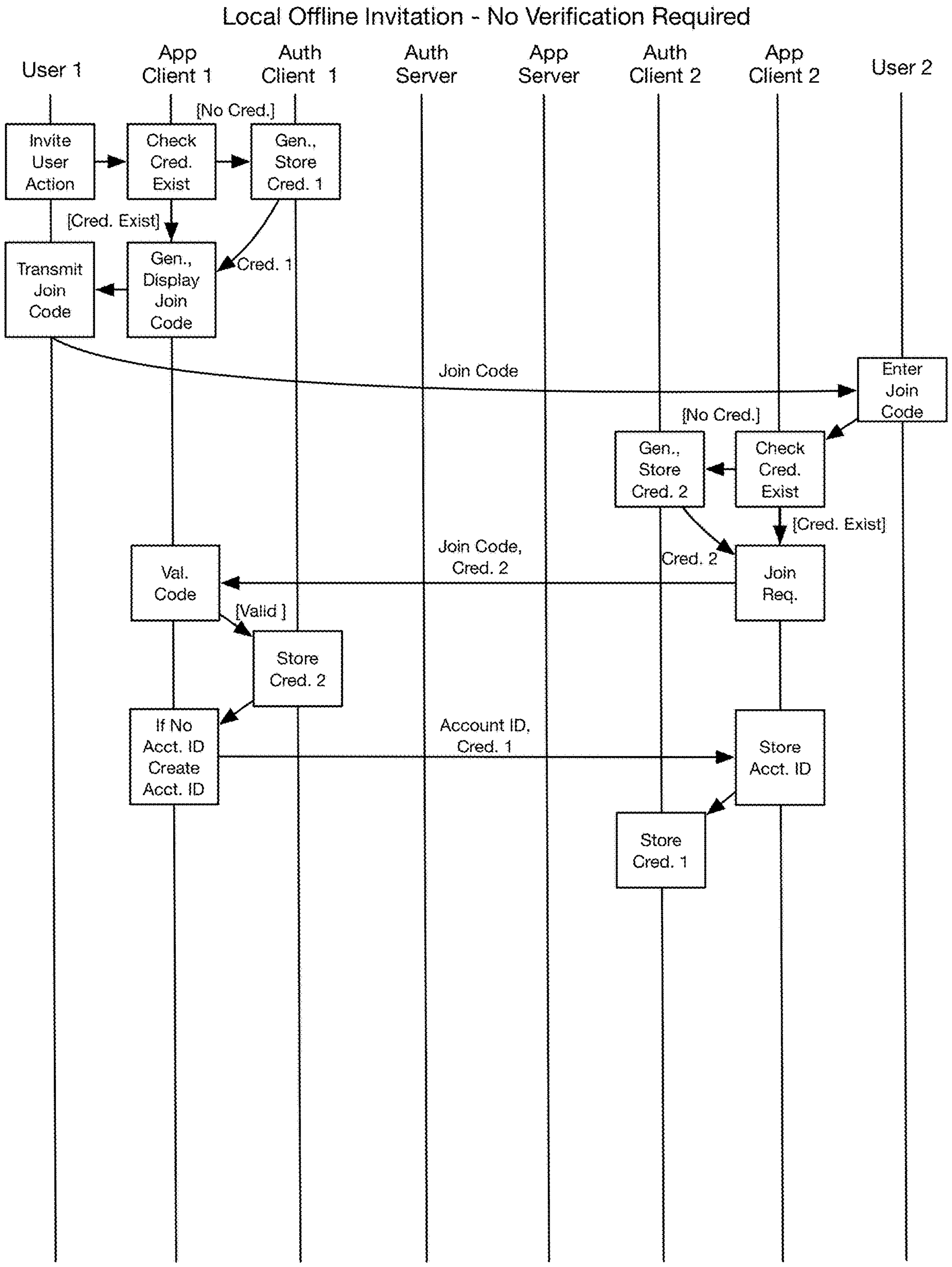
FIG. 14 shows an example of a local offline invitation, which may be used by the system of FIG. 1.

Referring to FIG. 14, an illustrative embodiment of offline user invitation from a mobile application without requiring verification using the system 100 from FIGS. 1A-D is shown. This embodiment is the same as the embodiment of user invitation from a mobile application without requiring verification, as described above and shown in FIG. 6, except this embodiment allows the inviting device 104 to invite the invited device 106 to communicate without requiring connection to the server.

Figure 7:
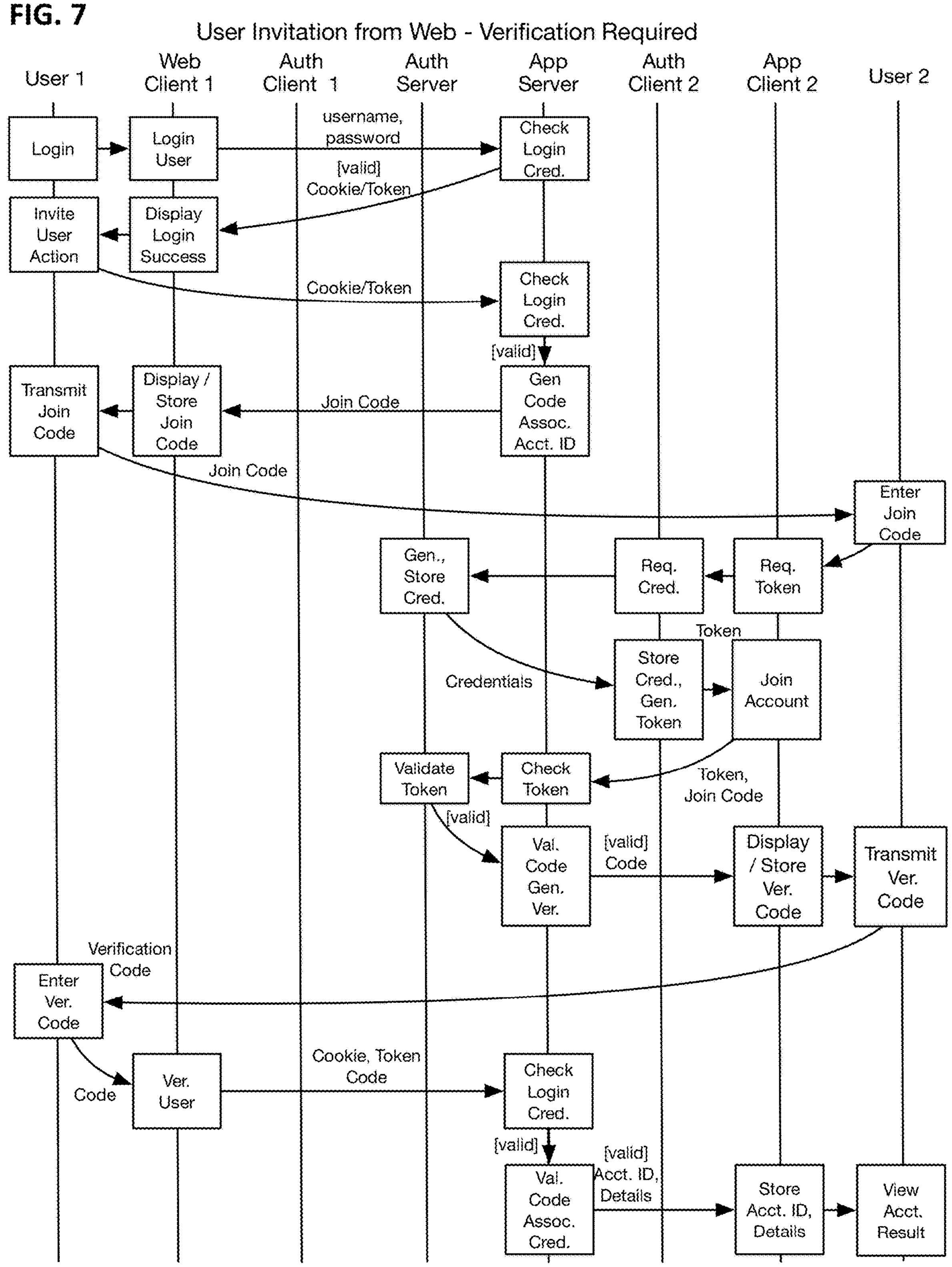
FIG. 7 shows an example of user invitation from a website requiring verification, which may be used by the system of FIG. 1 operating according to FIG. 2.

Referring to FIG. 7, an illustrative embodiment of user invitation from a website requiring verification using the system 100 from FIGS. 1A-D and operating according to FIG. 2 is shown. This embodiment is the same as the embodiment of user invitation from a mobile application requiring verification, as described above and shown in FIG. 5, except that a standard username and password are used to authenticate the inviting user and the auth token is generated by the backend instead of generated by the auth client.

Figure 8:
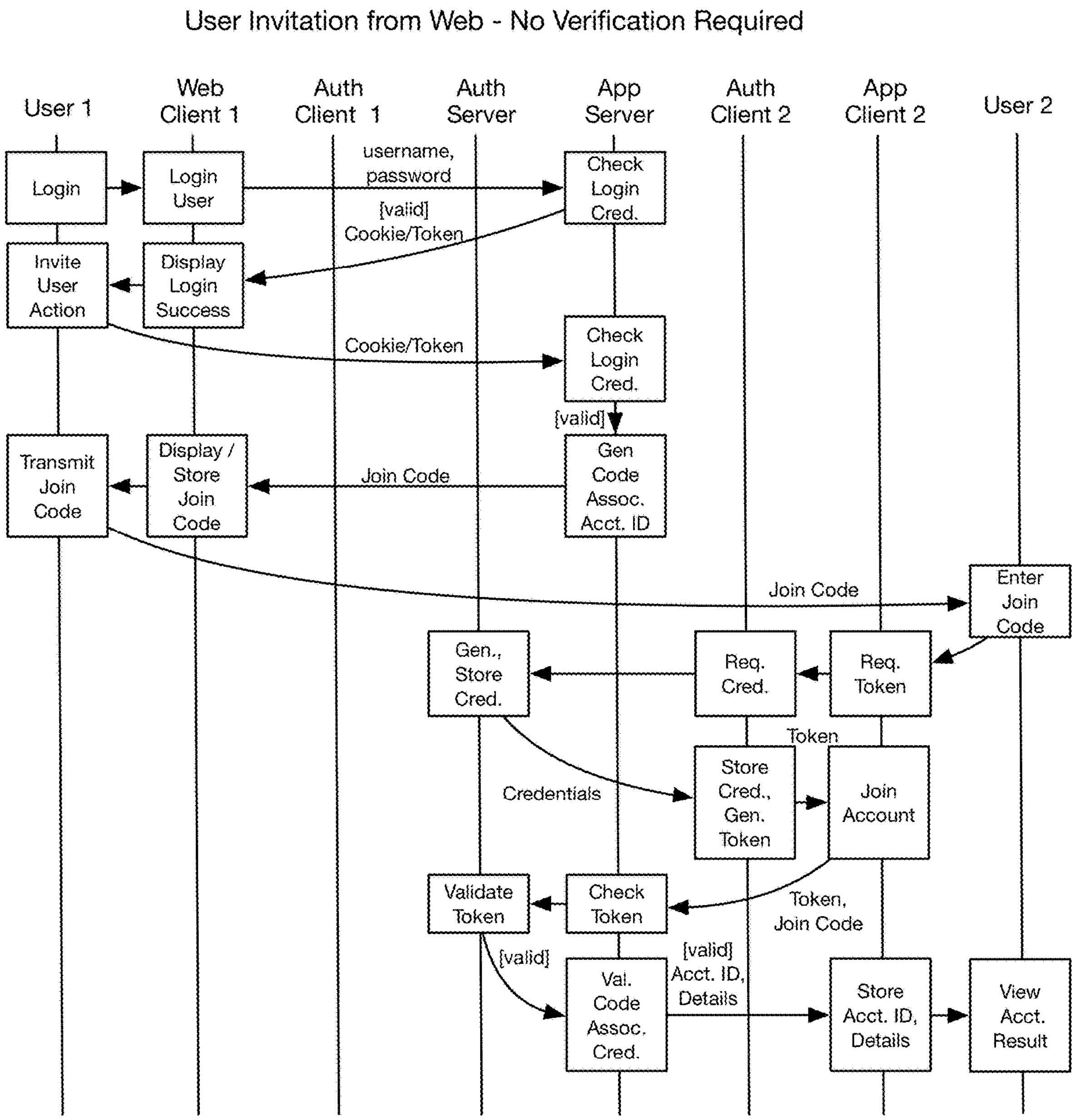
FIG. 8 shows an example of user invitation from a website, which may be used by the system of FIG. 1.

Referring to FIG. 8, an illustrative embodiment of user invitation from a website without requiring verification using the system 100 from FIGS. 1A-D is shown. This embodiment is the same as the embodiment of user invitation from a mobile application without requiring verification, as described above and shown in FIG. 6, except that a standard username and password are used to authenticate the inviting user and the auth token is generated by the backend instead of generated by the auth client.

Figure 9:
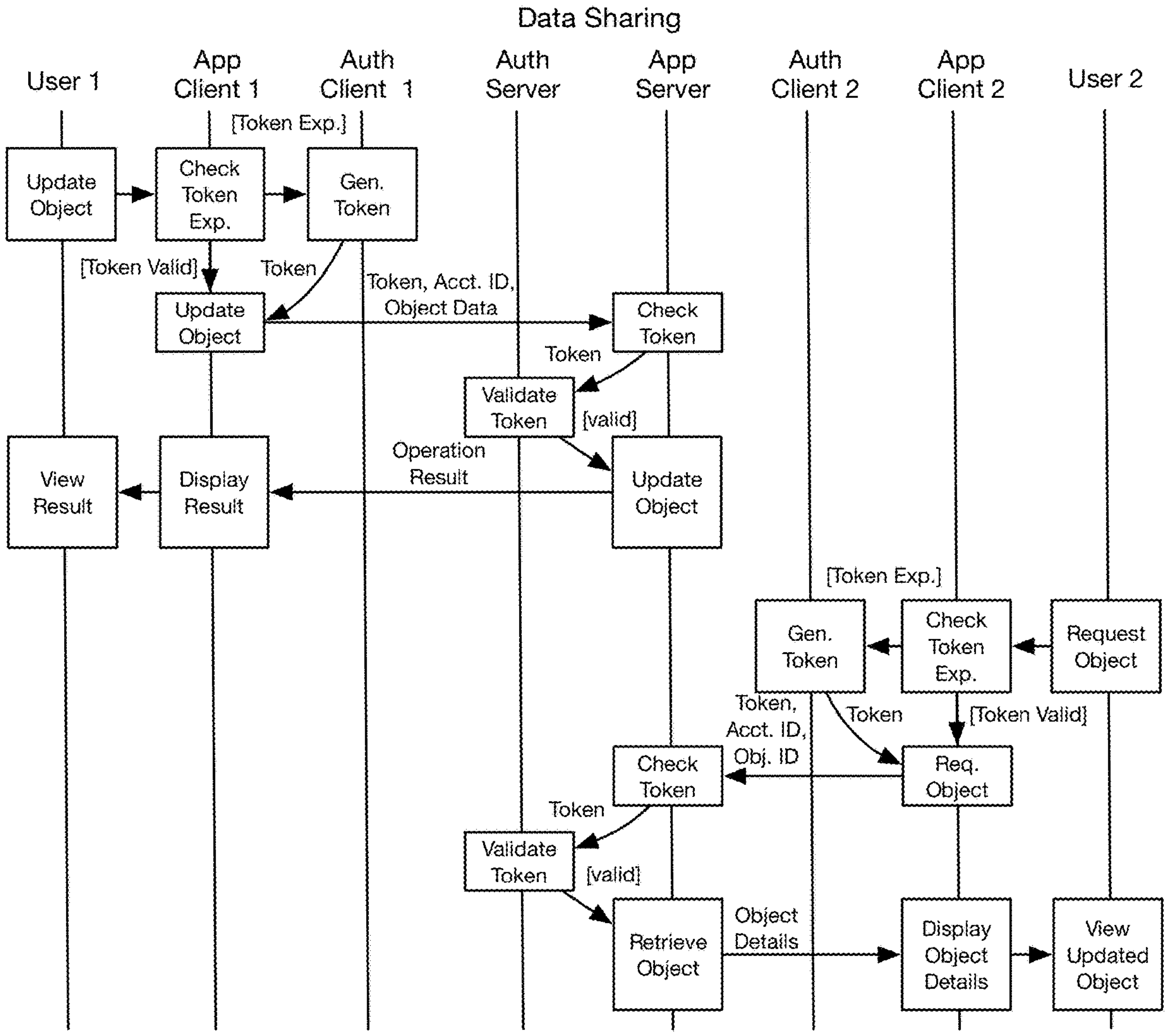
FIG. 9 shows an example of data sharing, which may be performed by the system of FIG. 1.

Referring to FIG. 9, an illustrative embodiment of data sharing using the system 100 from FIGS. 1A-D is shown. This embodiment shows authenticating a first user using the same approach as described above. The first user updates an object using the auth token. The second user is authenticated and requests the updated object. The first and second users are already associated with the account, so account identifiers, credentials, and object identifiers are used to update the object and request the updated object. Although not shown, users may be validated by their credentials to determine that the users are authorized to make changes to the account's data and view the account's data.

Figure 15:
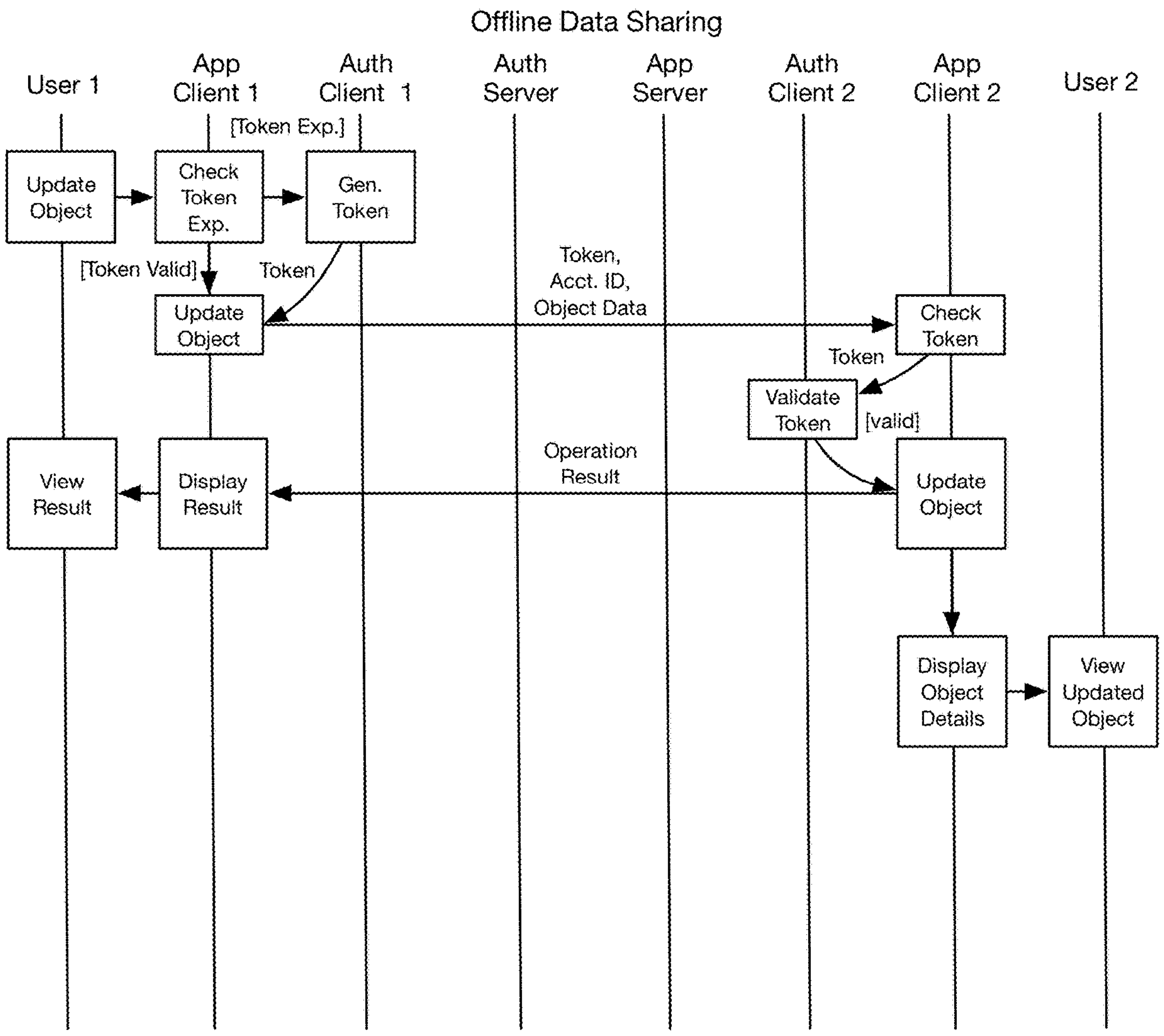
FIG. 15 shows an example of offline data sharing, which may be performed by the system of FIG. 1.

Referring to FIG. 15, an illustrative embodiment of offline data sharing using the system 100 from FIGS. 1A-D is shown. This embodiment is the same as the embodiment of data sharing, as described above and shown in FIG. 9, except this embodiment allows the inviting device 104 to communicate with the invited device 106 directly, rather than via the server. The communication may be via Bluetooth, Wi-Fi, direct connection, or any other method.

Figure 10:
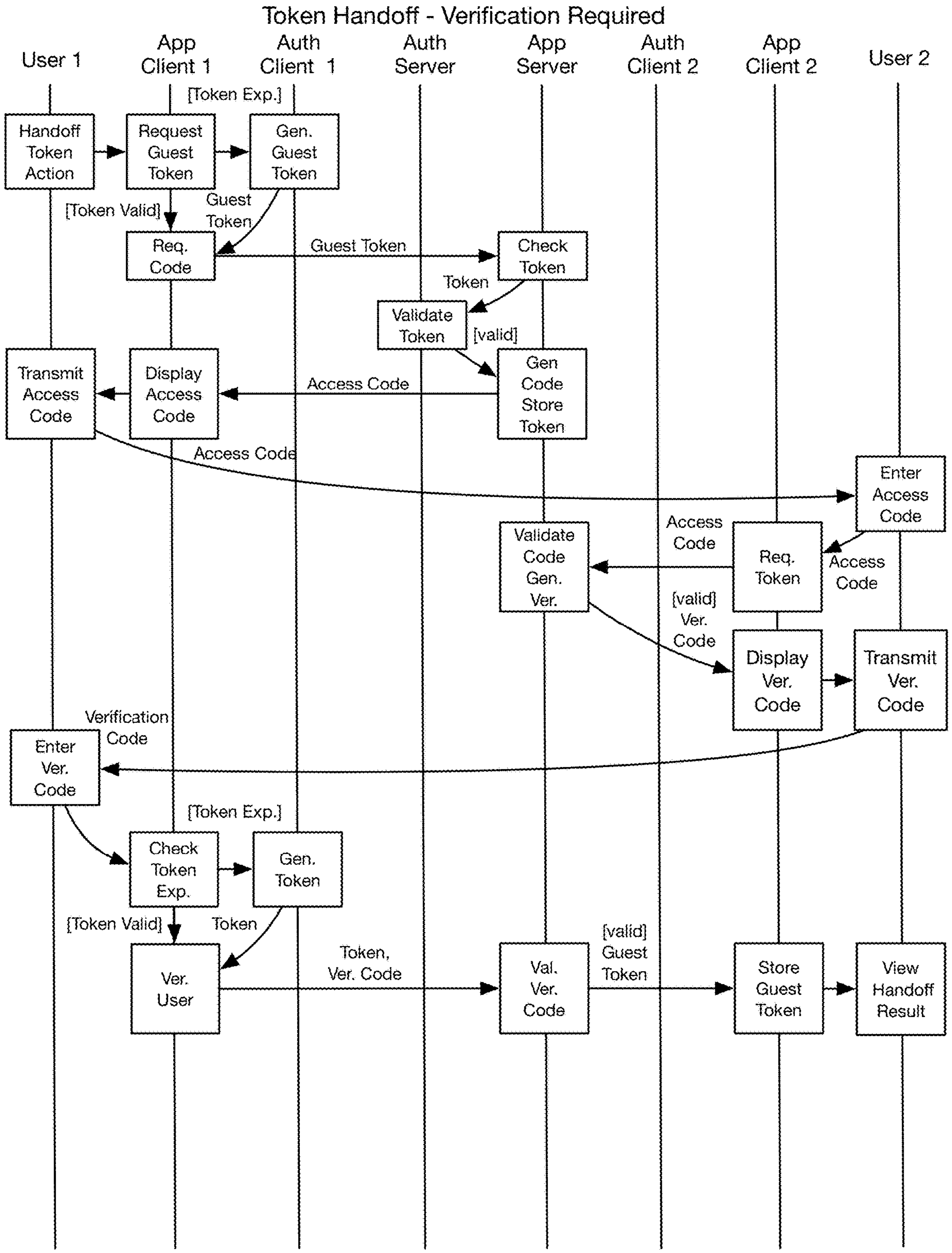
FIG. 10 shows an example of a token handoff with verification, which may be used by the system of FIG. 1 operating according to FIG. 2.

Referring to FIG. 10, an illustrative embodiment of a token handoff requiring verification using the system 100 from FIGS. 1A-D and operating according to FIG. 2 is shown. This embodiment allows a mobile app to generate an auth token and handoff the auth token to another client. This embodiment could be a web session, so that a user can log in via a web browser without a username and password. Note that this could be an alternative version of "User Invitation from Web", as shown in FIG. 7, where the user would log into the website and invite another user without needing a username and password to perform the login. The inviting user initiates a token handoff request using the user interface 114 of the inviting device 104. The app client of the inviting device 104 requests a guest auth token from the auth client of the inviting device 104. The auth client of the inviting device 104 generates a guest auth token. The app client of the inviting device 104 uses the network interface 116 of the inviting device 104 to send the guest auth token to the app server of the service 102 via an electronic communications network. The app server validates the guest auth token by passing the guest auth token to the auth server of the service 102. If valid, the app server stores the guest auth token and generates an invite code, which is associated with the account. The invite code is sent to the app client of the inviting device 104 via the electronic communications network using the network interface 108 of the service 102. The inviting device 104 displays the invite code to the inviting user via the user interface 114 of the inviting device 104. The inviting user communicates the invite code to an invited user (who may be the same as the inviting user). The invited user enters the invite code into the app client of the invited device using the user interface 122 of the invited device 106. The app client uses the network interface 124 of the invited device 106 to pass the invite code via the electronic communications network to the app server for validation. If valid, the app server returns a verification code, which is displayed to the invited user via the user interface 122 of the invited device 106. The invited user communicates the verification code to the inviting user, who enters the verification code into the app client of the inviting device 104 using the user interface 114 of the inviting device 104. The app client of the inviting device 104 checks and optionally refreshes an auth token and uses the network interface 116 of the inviting device 104 to pass the auth token and the verification code to the app server. The app server validates the token (not shown) and the verification code. If valid, the app server retrieves the guest auth token and uses the network interface 108 of the service 102 to return the guest auth token to the app client of the invited device 106, which stores the guest auth for future requests.

Figure 17:
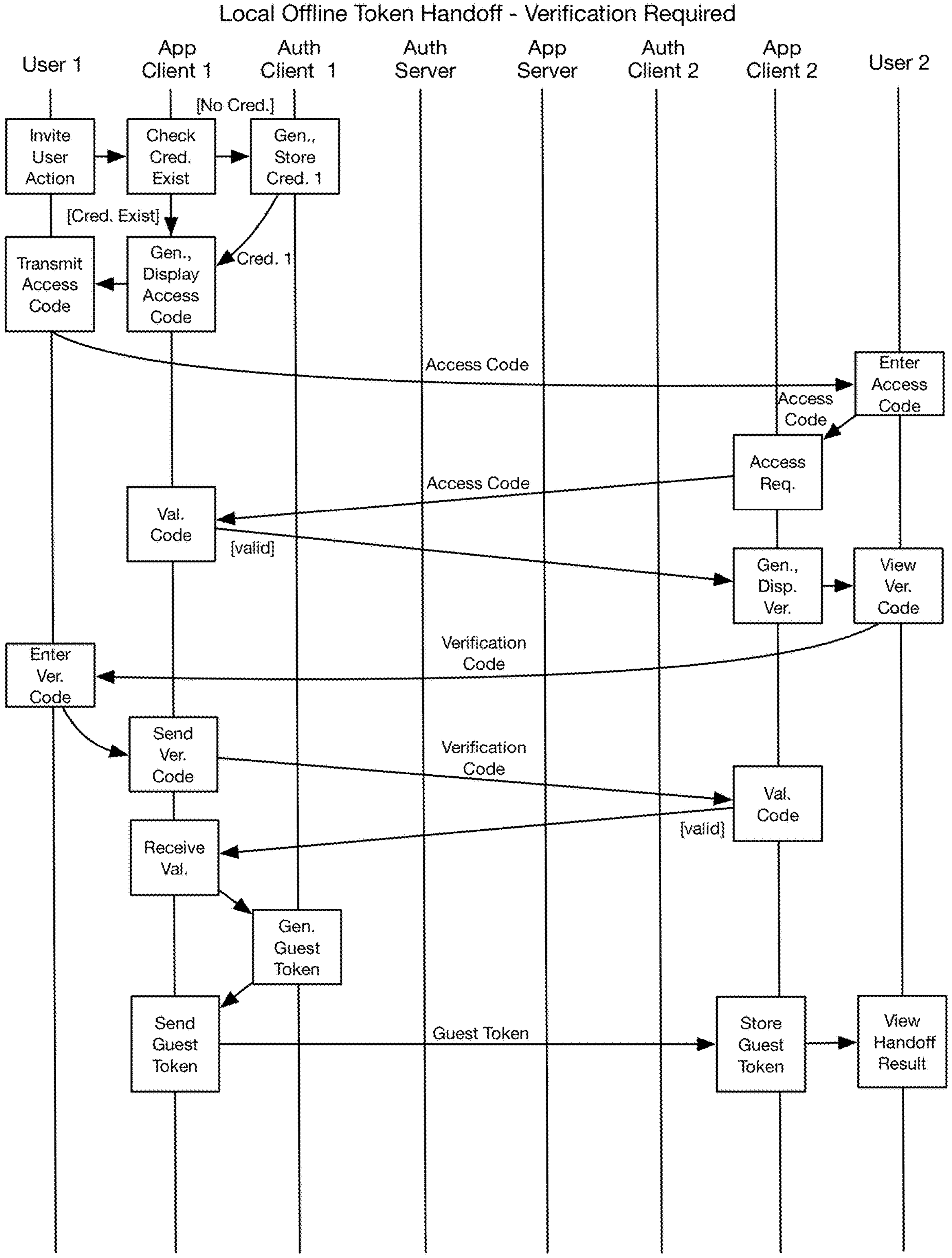
FIG. 17 shows an example of a local offline token handoff with verification, which may be used by the system of FIG. 1 operating according to FIG. 2.

Referring to FIG. 17, an illustrative embodiment of a local offline token handoff requiring verification using the system 100 from FIGS. 1A-D is shown. This embodiment is the same as the embodiment of a token handoff requiring verification, as described above and shown in FIG. 10, except this embodiment allows the inviting device 104 to communicate with the invited device 106 directly, rather than via the server.

Figure 11:
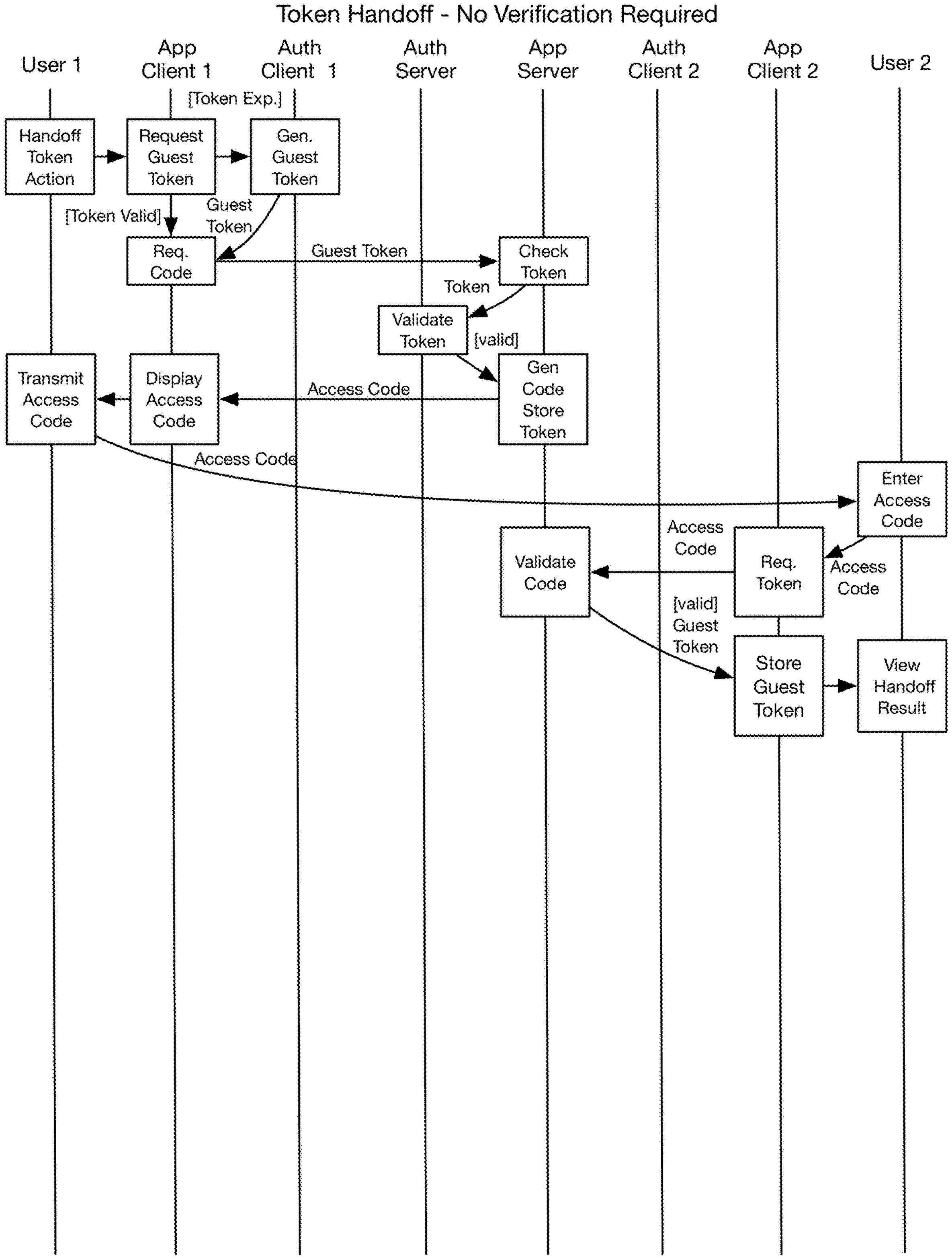
FIG. 11 shows an example of a token handoff, which may be used by the system of FIG. 1.

Referring to FIG. 11, an illustrative embodiment of a token handoff without requiring verification using the system 100 from FIGS. 1A-D is shown. This embodiment is the same as the embodiment of a token handoff requiring verification, as described above and shown in FIG. 10, except for the verification steps.

Figure 18:
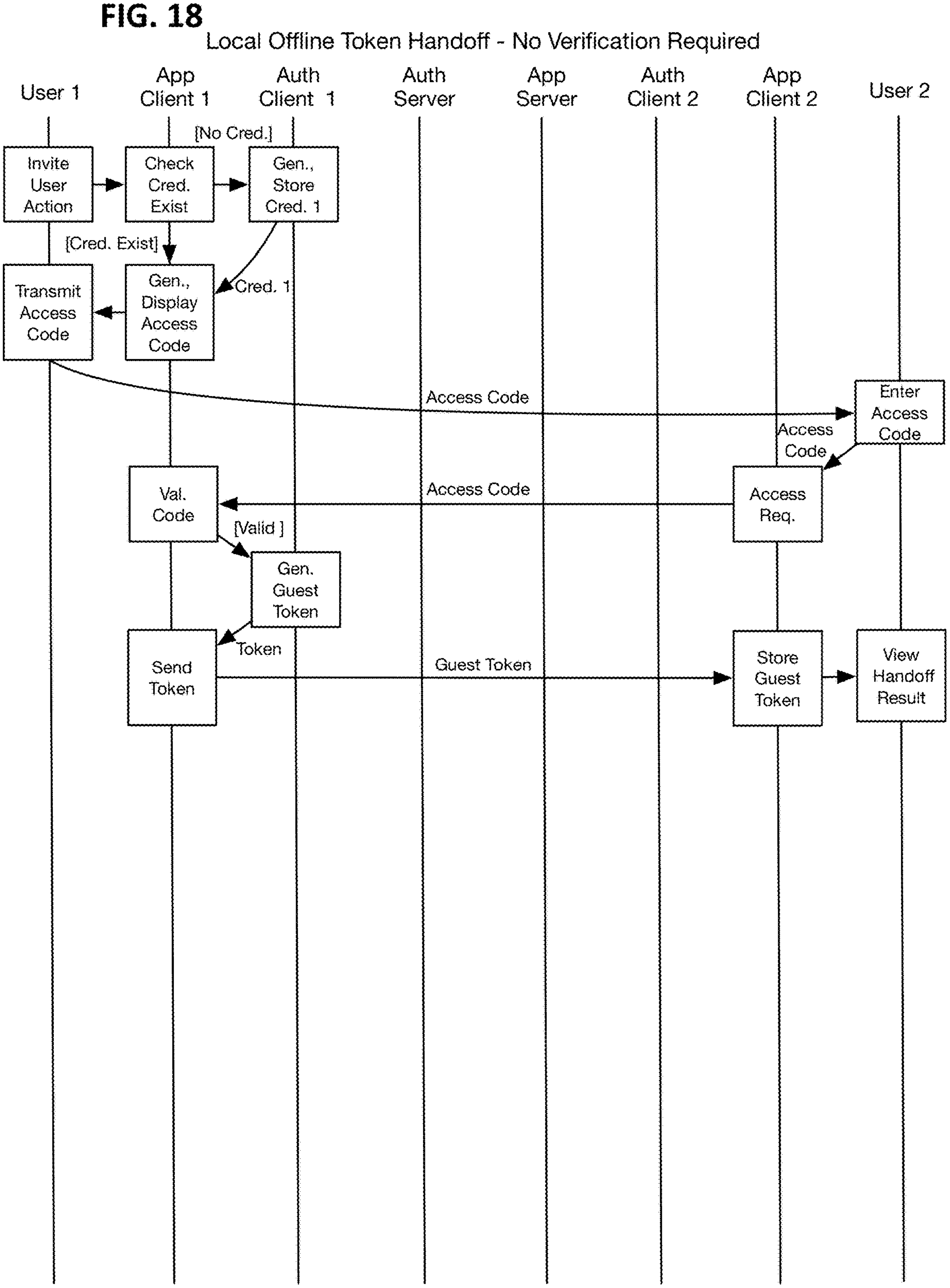
FIG. 18 shows an example of a local offline token handoff, which may be used by the system of FIG. 1.

Referring to FIG. 18, an illustrative embodiment of a local offline token handoff without requiring verification using the system 100 from FIGS. 1A-D is shown. This embodiment is the same as the embodiment of a token handoff without requiring verification, as described above and shown in FIG. 11, except this embodiment allows the inviting device 104 to communicate with the invited device 106 directly, rather than via the server.

Figure 16:
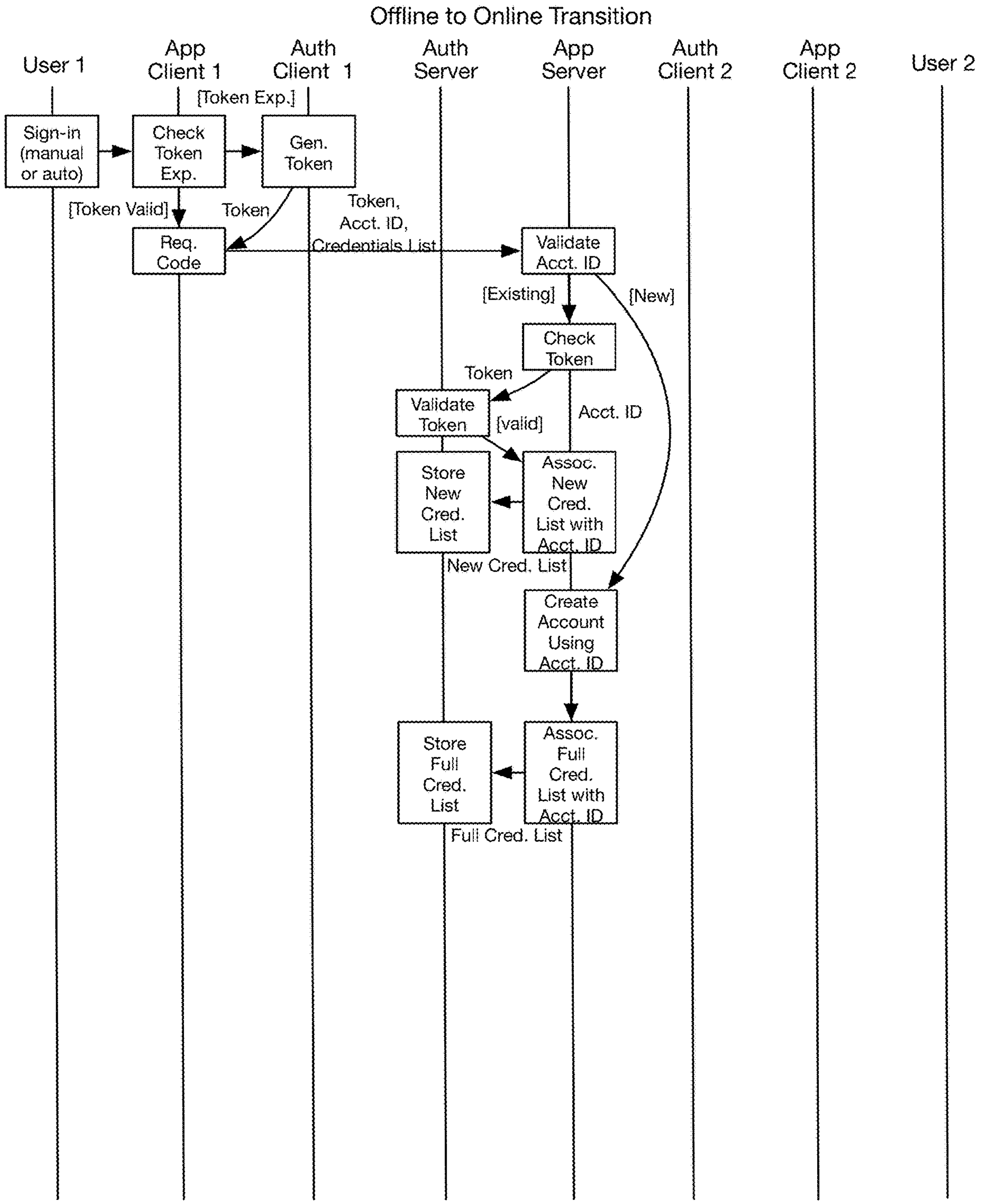
FIG. 16 shows example of offline to online transition, which may be performed by the system of FIG. 1.

Referring to FIG. 16, an illustrative embodiment of offline to online transition using the system 100 from FIGS. 1A-D is shown. This embodiment shows how the inviting device 104 may transition information to a service 102. The credentials list refers to all sets of credentials with which the inviting device 104 communicates, including its own credentials. If the service 102 does not already have the account, it will create a new account using the provided account identifier and will add the credentials list to the account. If the service 102 already has the provided account, it will validate that the inviting device 104 has the correct permissions to perform the operation and, if yes, adds the list of new credentials to the account (full list excluding the credentials of the inviting device 104 performing the request). Any device with its credentials on the credentials list can communicate via the server or locally. Only devices with the required permission can add new credentials to the account. If any device could add its own credentials to an account, acquisition of an account identifier would provide any acquiring device unauthorized access to the account simply by providing the account identifier and its credentials.

Figure 12:
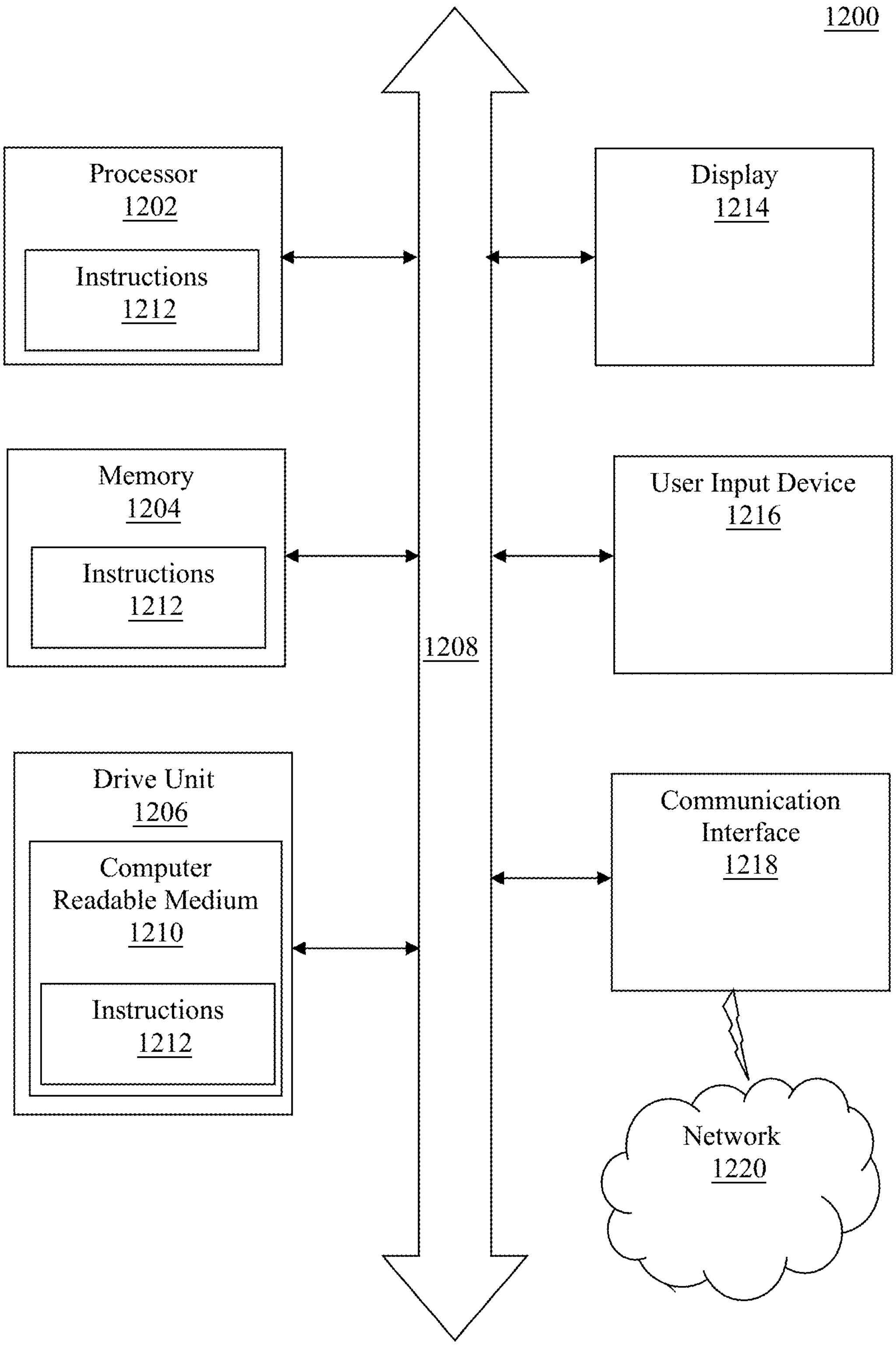
FIG. 12 shows an illustrative embodiment of a general computer system which may be used to implement one or more components of the system of FIG. 1.

Referring to FIG. 12, an illustrative embodiment of a general computer system 1200 is shown. The computer system 1200 can include a set of instructions that can be executed to cause the computer system 1200 to perform any one or more of the methods or computer based functions disclosed herein. The computer system 1200 may operate as a standalone device or may be connected, e.g., using an electronic communications network, to other computer systems or peripheral devices. Any of the components or modules discussed above, such as the processors 110, 118, and 126, may be a computer system 1200 or a component in the computer system 1200. The computer system 1200 may implement the computer implemented system of FIGS. 1A-D and/or the inviting device 104 and the invited device 106.

In a networked deployment, the computer system 1200 may operate in the capacity of a server or as a client user computer in a client-server user network environment, or as a peer computer system in a peer-to-peer (or distributed) network environment. The computer system 1200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1200 can be implemented using electronic devices that provide voice, video or data communication. Further, while a single computer system 1200 is illustrated, the term "system" shall also be taken to include any collection or cluster of systems or sub-systems that individually or jointly execute a set, or multiple sets, of instructions to perform one or more computer functions.

As illustrated in FIG. 12, the computer system 1200 may include a processor 1202, e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, specifically configured processors, digital signal processors, application specific integrated circuits, field programmable gate arrays, servers, networks, digital circuits, analog circuits, combinations thereof, or other now known or later developed devices for analyzing and processing data. The processor 1202 may implement a software program, such as code generated manually (i.e., programmed).

The computer system 1200 may include a memory 1204 that can communicate via a bus 1208. The memory 1204 may be a main memory, a static memory, or a dynamic memory. The memory 1204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1204 includes a cache or random access memory for the processor 1202. In alternative embodiments, the memory 1204 is separate from the processor 1202, such as a cache memory of a processor, the system memory, or other memory. The memory 1204 may be an external storage device or database for storing data. Examples include a hard drive, solid state drive, compact disc ("CD"), digital video disc ("DVD"), memory card, memory stick, floppy disc, universal serial bus ("USB") memory device, or any other device operative to store data. The memory 1204 is operable to store instructions executable by the processor 1202. The functions, acts or tasks illustrated in the figures or described herein may be performed by the programmed processor 1202 executing the instructions 1212 stored in the memory 1204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1200 may further include a display unit 1214, such as a liquid crystal display (LCD), an organic light emitting diode (OLED), a flat panel display, a solid state display, a cathode ray tube (CRT), a projector, a printer or other now known or later developed display device for outputting determined information. The display 1214 may act as an interface for the user to see the functioning of the processor 1202, or specifically as an interface with the software stored in the memory 1204 or in the drive unit 1206.

Additionally, the computer system 1200 may include an input device 1216 configured to allow a user to interact with any of the components of system 1200. The input device 1216 may be a number pad, a keyboard, or a cursor control device, such as a mouse, or a joystick, touch screen display, remote control or any other device operative to interact with the system 1200.

In a particular embodiment, as depicted in FIG. 12, the computer system 1200 may also include a disk or optical drive unit 1206. The disk drive unit 1206 may include a computer-readable medium 1210 in which one or more sets of instructions 1212, e.g. software, can be embedded. Further, the instructions 12412 may embody one or more of the methods or logic as described herein. In a particular embodiment, the instructions 1212 may reside completely, or at least partially, within the memory 1204 and/or within the processor 1202 during execution by the computer system 1200. The memory 1204 and the processor 1202 also may include computer-readable media as discussed above.

The present disclosure contemplates a non-transitory computer-readable medium that includes instructions 1212 or receives and executes instructions 1212 responsive to a propagated signal, so that a device connected to a network 1220 can communicate voice, video, audio, images or any other data over the network 1220. Further, the instructions 1212 may be transmitted or received over the network 1220 via a communication interface 1218. The communication interface 1218 may be a part of the processor 1202 or may be a separate component. The communication interface 1218 may be created in software or may be a physical connection in hardware. The communication interface 1218 is configured to connect with a network 1220, external media, the display 1214, or any other components in system 1200, or combinations thereof. The connection with the network 1220 may be a physical connection, such as a wired Ethernet connection or may be established wirelessly as discussed below. Likewise, the additional connections with other components of the system 1200 may be physical connections or may be established wirelessly.

The network 1220 may include wired networks, wireless networks, or combinations thereof. The wireless network may be a cellular telephone network, an 802.11, 802.16, 802.20, or WiMax network. Further, the network 1220 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by an electronic communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., an electronic communication network. Examples of electronic communication networks include a local area network ("LAN") and a wide area network ("WAN"), e.g., the Internet.

The computing system can include clients and servers. A client and server are generally remote from each other and typically interact through an electronic communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:

receiving, by a processor of an inviting device which has access to an account provided by a service, a request to enable another device to have access to the account, the request not identifying the other device or a user thereof;

generating, by the processor in response to receipt of the request and without an identification of the other device or the user thereof, an invite code unique only to the account and operable to at least enable the service, in receipt of the invite code, to identify the account and to indicate to the service that a device communicating the invite code thereto is authorized to access the account; and providing, by the processor, the invite code from the inviting device to the invited device.

2. The computer implemented method of claim 1, wherein the service is hosted on the inviting device.

3. The computer implemented method of claim 1, wherein the invite code comprises one of a string of words or an optically readable code.

4. The computer implemented method of claim 1, wherein the invite code is characterized by time limit after which the invite code expires.

5. The computer implemented method of claim 1, wherein the providing further comprises searching, by the processor for one or more available devices to be invited and transmitting the invite code thereto.

6. The computer implemented method of claim 1, wherein the service comprises collection and processing of farming related data.

7. The computer implemented method of claim 1, wherein the service facilitates communication between the inviting device and each invited device but not between invited devices.

8. The computer implemented method of claim 1, wherein the access to the account includes an ability to read data from and/or write data to the account, the invited device, enabled by the inviting device to have access to the account, being able to read data stored in the account by any of one or more invited devices also enabled by the inviting device to have access to the account, and the invited device being further able to store data in the account to be read by any of the one or more invited devices.

9. The computer implemented method of claim 1 further comprising:

receiving the invite code by a processor of the invited device; and communicating, by the processor of the invited device via an electronic communications network coupled therebetween, the received invite code to the service, the service enabling access to the invited device to the account based thereon.

10. The computer implemented method of claim 1, wherein the generating further comprises:

communicating, by the processor of the inviting device to the service via an electronic communications network coupled therebetween, the request to enable another device to have access to the service account; and receiving, by the processor of the inviting device from the service via the electronic communications network, the invite code generated by the service.

11. The computer implemented method of claim 10, wherein the request communicated by the processor of the inviting device to the service comprises a unique identifier indicative of the inviting device having authenticated access to the account.

12. The computer implemented method of claim 1, wherein the providing comprises transmitting the invite code in an electronically communicated message from the inviting device to the invited device.

13. The computer implemented method of claim 1, wherein each of the inviting device and the invited device comprises one of a mobile device, a computer, or a tablet device.

14. The computer implemented method of claim 1, wherein the service is a remote service.

15. A device comprising:

a processor, which has access to an account provided by a service, and a memory coupled therewith, the memory storing computer executable instructions operable to cause the processor to:

receive a request to enable another device to have access to the account, the request not identifying the other device or a user thereof;

generate, in response to receipt of the request and without an identification of the other device or the user thereof, an invite code unique only to the account and operable to at least enable the service, in receipt of the invite code, to identify the account and to indicate to the service that a device communicating the invite code thereto is authorized to access the account; and provide the invite code from the inviting device to the invited device.

16. The device of claim 15, wherein the service is hosted on the inviting device.

17. The device of claim 15, wherein the invite code comprises one of a string of words or an optically readable code.

18. The device of claim 15, wherein the computer executable instructions are further executable by the processor to cause the processor to search for one or more available devices to be invited and transmit the invite code thereto.

19. The device of claim 15, wherein the service comprises collection and processing of farming related data.

20. The device of claim 15, wherein the service facilitates communication between the inviting device and each invited device but not between invited devices.

21. The device of claim 15, wherein the access to the account includes an ability to read data from and/or write data to the account, the invited device, enabled by the inviting device to have access to the account, being able to read data stored in the account by any of one or more invited devices also enabled by the inviting device to have access to the account, and the invited device being further able to store data in the account to be read by any of the one or more invited devices.

22. The device of claim 15, wherein the computer executable instructions are further executable by the processor to cause the processor to:

communicate, to the service via an electronic communications network coupled with the processor, the request to enable another device to have access to the service account; and receive, from the service via the electronic communications network, the invite code generated by the service.

23. The device of claim 22, wherein the request communicated by the processor of the inviting device to the service comprises a unique identifier indicative of the inviting device having authenticated access to the account.

24. The device of claim 15, wherein the computer executable instructions are further executable by the processor to cause the processor to transmit the invite code in an electronically communicated message from the inviting device to the invited device.

25. The device of claim 15, wherein each of the inviting device and the invited device comprises one of a mobile device, a computer, or a tablet device.

26. The device of claim 15, wherein the service is a remote service.

27. A device, which has access to an account provided by a service, comprising:

means for receiving a request to enable another device to have access to the account, the request not identifying the other device or a user thereof;

means for generating, in response to receipt of the request and without an identification of the other device or the user thereof, an invite code unique only to the account and operable to at least enable the service, in receipt of the invite code, to identify the account and to indicate to the service that a device communicating the invite code thereto is authorized to access the account; and means for providing the invite code from the inviting device to the invited device.

28. A computer implemented method comprising:

receiving, by a processor of a service from a processor of an inviting device, a request to enable another device to have access to an account provided by the service, the request not identifying the other device or a user thereof;

generating, by the processor of the service based on the received request which does not identify the other device or the user thereof, an invite code unique only to the account and operable to identify the account and to indicate that a device communicating the invite code to the service is authorized to access the account;

communicating, by the processor of the service, the invite code to the processor of the inviting device; and enabling, by the processor of the service upon receipt of the invite code from a processor of the other device, access to the account from the other device.

29. The computer implemented method of claim 28, wherein the service comprises a remote service, the request being received by the processor of the service from the processor of the inviting device, and the invite code being communicated to the inviting device, via an electronic communications network coupled therebetween.

30. The computer implemented method of claim 28, wherein the service is hosted on the inviting device.

31. The computer implemented method of claim 28, wherein the invite code comprises one of a string of words or an optically readable code.

32. The computer implemented method of claim 28, wherein the invite code is characterized by time limit after which the invite code expires.

33. The computer implemented method of claim 28, wherein the service comprises collection and processing of farming related data.

34. The computer implemented method of claim 28, wherein the service facilitates communication between the inviting device and each invited device but not between invited devices.

35. The computer implemented method of claim 28, wherein the access to the account includes an ability to read data from and/or write data to the account, the invited device, enabled by the inviting device to have access to the account, being able to read data stored in the account by any of one or more invited devices also enabled by the inviting device to have access to the account, and the invited device being further able to store data in the account to be read by any of the one or more invited devices.

36. A system comprising:

a processor and a memory coupled therewith, the memory storing computer executable instructions that when executed by the processor, cause the processor to implement a service, the computer executable instructions being further executable by the processor to cause the processor to:

receive from a processor of an inviting device, a request to enable another device to have access to an account provided by the service, the request not identifying the other device or a user thereof;

generate, based on the received request which does not identify the other device or the user thereof, an invite code unique only to the account and operable to identify the account and to indicate that a device communicating the invite code to the service is authorized to access the account;

communicate the invite code to the processor of the inviting device; and enable the service upon receipt of the invite code from a processor of the other device, access to the account from the other device.

37. The system of claim 36, wherein the service comprises a remote service, the request being received by the processor of the service from the processor of the inviting device, and the invite code being communicated to the inviting device, via an electronic communications network coupled therebetween.

38. The system of claim 36, wherein the service is hosted on the inviting device.

39. The system of claim 36, wherein the invite code comprises one of a string of words or an optically readable code.

40. The system of claim 36, wherein the invite code is characterized by time limit after which the invite code expires.

41. The system of claim 36, wherein the service comprises collection and processing of farming related data.

42. The system of claim 36, wherein the service facilitates communication between the inviting device and each invited device but not between invited devices.

43. The system of claim 36, wherein the access to the account includes an ability to read data from and/or write data to the account, the invited device, enabled by the inviting device to have access to the account, being able to read data stored in the account by any of one or more invited devices also enabled by the inviting device to have access to the account, and the invited device being further able to store data in the account to be read by any of the one or more invited devices.

44. A system comprising:

means for receiving, from a processor of an inviting device, a request to enable another device to have access to an account provided by the service, the request not identifying the other device or a user thereof;

means for generating, based on the received request which does not identify the other device or the user thereof, an invite code unique only to the account and operable to identify the account and to indicate that a device communicating the invite code to the service is authorized to access the account;

means for communicating the invite code to the processor of the inviting device; and means for enabling, upon receipt of the invite code from a processor of the other device, access to the account from the other device.

* * * * *